(12) United States Patent
Terao

(10) Patent No.: US 11,580,784 B2
(45) Date of Patent: Feb. 14, 2023

(54) MODEL LEARNING DEVICE, MODEL LEARNING METHOD, AND RECORDING MEDIUM

(71) Applicant: NEC Corporation, Tokyo (JP)

(72) Inventor: Makoto Terao, Tokyo (JP)

(73) Assignee: NEC CORPORATION, Tokyo (JP)

(*) Notice: Subject to any disclaimer, the term of this patent is extended or adjusted under 35 U.S.C. 154(b) by 305 days.

(21) Appl. No.: 16/767,767

(22) PCT Filed: Dec. 5, 2018

(86) PCT No.: PCT/JP2018/044685
§ 371 (c)(1),
(2) Date: May 28, 2020

(87) PCT Pub. No.: WO2019/111932
PCT Pub. Date: Jun. 13, 2019

(65) Prior Publication Data
US 2020/0342215 A1    Oct. 29, 2020

(30) Foreign Application Priority Data
Dec. 8, 2017  (JP) .............................. JP2017-236143

(51) Int. Cl.
*G06V 40/20*   (2022.01)
*G06N 20/00*   (2019.01)
(Continued)

(52) U.S. Cl.
CPC ........... *G06V 40/23* (2022.01); *G06K 9/6297* (2013.01); *G06N 20/00* (2019.01); *G06T 7/20* (2013.01)

(58) Field of Classification Search
None
See application file for complete search history.

(56) References Cited

U.S. PATENT DOCUMENTS

2009/0208111 A1   8/2009  Jeong et al.
2009/0276705 A1*  11/2009 Ozdemir ................ G06V 40/20
                                              715/708
2017/0351928 A1   12/2017 Yamanaka et al.

FOREIGN PATENT DOCUMENTS

JP   2009-157770 A   7/2009
JP   2012-128877 A   7/2012
(Continued)

OTHER PUBLICATIONS

International Search Report for PCT Application No. PCT/JP2018/044685, dated Feb. 26, 2019.
(Continued)

*Primary Examiner* — Nurun Flora
(74) *Attorney, Agent, or Firm* — Sughrue Mion, PLLC

(57) ABSTRACT

A model learning device provided with: an error-added movement locus generation unit for adding an error to movement locus data for action learning that represents the movement locus of a subject and to which is assigned an action label that is information representing the action of the subject, and thereby generating error-added movement locus data; and an action recognition model learning unit for learning a model, using at least the error-added movement locus data and learning data created on the basis of the action label, by which model the action of some subject can be recognized from the movement locus of the subject. Thus, it is possible to provide a model by which the action of a subject can be recognized with high accuracy on the basis of the movement locus of the subject estimated using a camera image.

7 Claims, 17 Drawing Sheets

(51) Int. Cl.
*G06K 9/62* (2022.01)
*G06T 7/20* (2017.01)

(56) References Cited

FOREIGN PATENT DOCUMENTS

| | | |
|---|---|---|
| JP | 2014-238674 | 12/2014 |
| JP | 2017-215861 A | 12/2017 |
| WO | 2014/083910 A1 | 6/2014 |

OTHER PUBLICATIONS

English translation of Written opinion for PCT Application No. PCT/JP2018/044685, dated Feb. 26, 2019.
Japanese Office Communication for JP Application No. 2019-558244 dated Jan. 25, 2022 with English Translation.

* cited by examiner

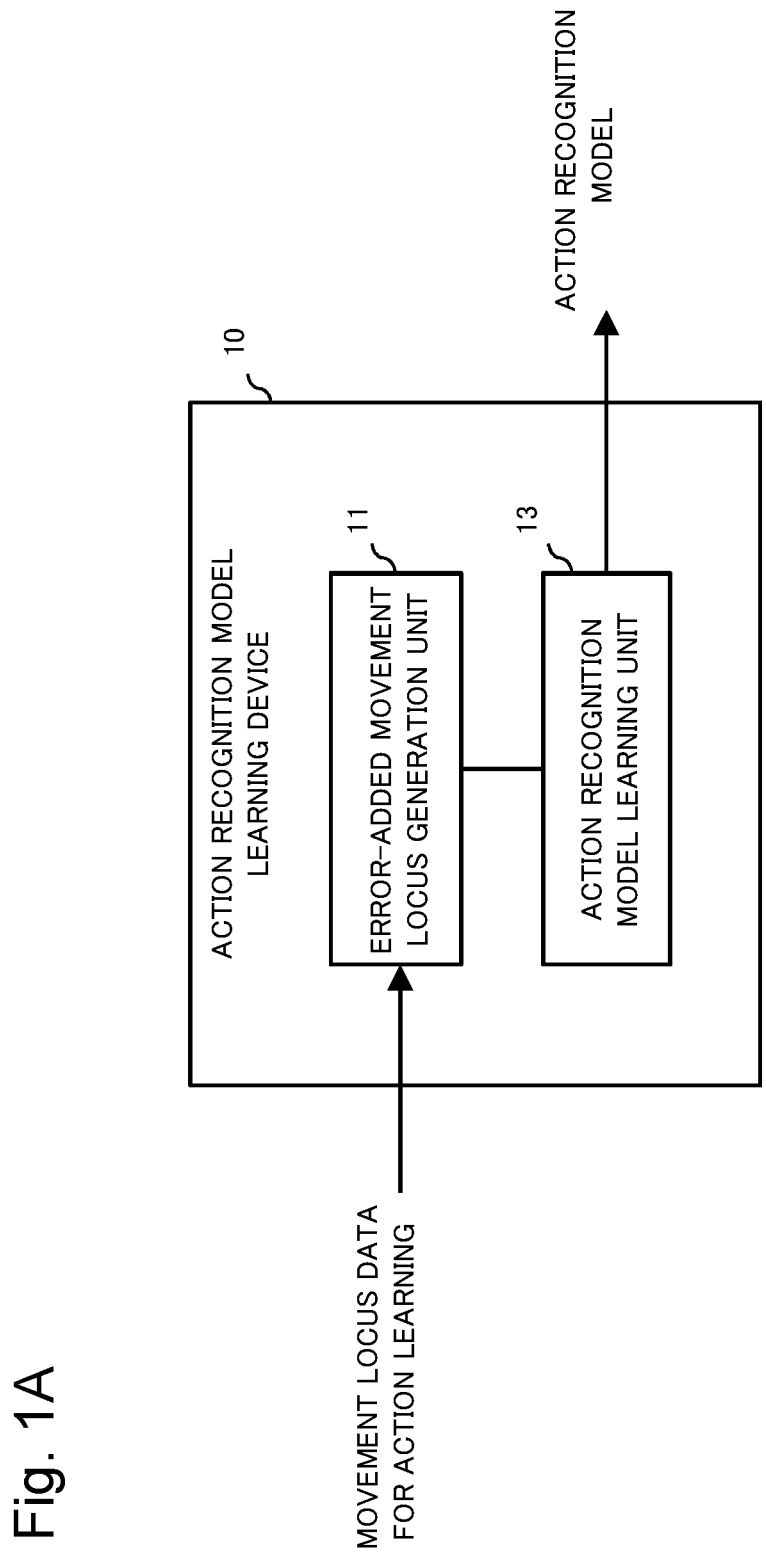

MODEL LEARNING DEVICE, MODEL LEARNING METHOD, AND RECORDING MEDIUM

This application is a National Stage Entry of PCT/JP2018/044685 filed on Dec. 5, 2018, which claims priority from Japanese Patent Application 2017-236143 filed on Dec. 8, 2017, the contents of all of which are incorporated herein by reference, in their entirety.

TECHNICAL FIELD

The present disclosure relates to a technique for learning, from a movement locus of a subject, a model for recognizing an action of the subject.

BACKGROUND ART

A technique for analyzing an action of a subject (such as a person) by using an image by a monitoring camera and the like has been paid attention to. For example, it is expected to prevent in advance an incident or an accident by automatically and efficiently finding a suspicious action in a station, a shopping mall, and the like.

PTL 1 describes one example of a technique for recognizing an action of a person by using an image (camera image) captured by capturing equipment such as a camera. In the technique described in PTL 1, a model for recognizing an action of a person by using a locus (movement locus) along which the person has moved is learned in advance by a support vector machine and the like. Next, by analyzing the camera image, information (movement locus information) representing a movement locus of a subject to be monitored is acquired, and a suspicious action of the subject to be monitored is determined by using the model that has been learned in advance, and the movement locus information, PTL 2 describes a technique in which a state transition model is learned by assigning a state to movement locus data of a moving body, and an action of the movement locus data is determined by using the learned state transition model.

PTL 3 describes a technique for tracking a subject to be tracked within a real space while suppressing an influence of observation noise included in an image area including the subject to be tracked.

CITATION LIST

Patent Literature

[PTL 1] Japanese Unexamined Patent Application Publication No. 2012-128877
[PTL 2] Japanese Unexamined Patent Application Publication No. 2009-157770
[PTL 3] International Publication No. WO2014/083910

SUMMARY OF INVENTION

Technical Problem

However, when the technique described in PTL 1 is employed, there occurs an issue that recognition accuracy on an action of a person is low. A reason for this is that, generally, an estimation error is included in a movement locus of a person to be estimated by using a camera image, and misrecognition of an action may occur by the estimation error. As one example, it is assumed that "normal walking", which means walking straight, and "wandering", which means walking in a zigzag manner are classified by using a movement locus. Since a movement locus estimated by using a camera image includes an estimation error (fluctuation), even in normal walking, a movement locus including fluctuation is estimated. When walking manners are classified by inputting a movement locus including such fluctuation, there is a possibility that normal walking is misrecognized (erroneously determined) as wandering.

When the technique described in PTL 2 is employed, there is a possibility that an estimation error is included in a generated feature. Therefore, for example, there is a possibility that a feature of "wandering" and a feature of "normal walking" are classified in a same cluster. The technique described in PTL 3 is a technique for removing noise from an image.

A technique according to the present disclosure has been developed in view of such circumstances. Specifically, one of objects of the present disclosure is to provide a model learning device (action recognition model learning device) and the like that enable learning an action recognition model capable of recognizing an action of a subject with high accuracy, based on a movement locus of the subject (such as a person).

Solution to Problem

In order to accomplish the above-described object, a model learning device according to one aspect of the present disclosure is configured as follows. Specifically, a model learning device according to one aspect of the present disclosure includes: an error-added movement locus generation unit that generates error-added movement locus data by adding an error to movement locus data for action learning, the movement locus data for action learning representing a movement locus of a subject and including an action label, the action label being information about an action of the subject; and an action recognition model learning unit that learns a model from a movement locus of a certain subject by using learning data, the model being a model to recognize an action of the subject, the learning data being generated based on at least the error-added movement locus data and the action label.

A model learning method according to another aspect of the present disclosure includes: generating error-added movement locus data by adding an error to movement locus data for action learning, the movement locus data for action learning representing a movement locus of a subject and including an action label, the action label being information about an action of the subject; and learning a model from a movement locus of a certain subject by using learning data, the model being a model to recognize an action of the subject, the learning data being generated based on at least the error-added movement locus data and the action label.

The same object is also accomplished by a computer program (model learning program) for achieving a model learning device, a model learning method, and the like having the above-described configuration by a computer, and a computer-readable recording medium and the like storing the computer program.

Specifically, a computer program according to yet another aspect of the present disclosure causes a computer to execute: generating error-added movement locus data by adding an error to movement locus data for action learning, the movement locus data for action learning representing a movement locus of a subject and including an action label, the action label being information about an action of the subject; and learning a model from a movement locus of a certain subject by using learning data, the model being a model to recognize an action of the subject, the learning data being generated based on at least the error-added movement locus data and the action label. Further, a recording medium according to still another aspect of the present disclosure may record the above-described computer program.

Advantageous Effects of Invention

The present disclosure enables learning an action recognition model capable of recognizing an action of a subject with high accuracy, based on a movement locus of the subject.

BRIEF DESCRIPTION OF DRAWINGS

FIG. 1A is a block diagram exemplifying a functional configuration of an action recognition model learning device according to a first example embodiment of the present disclosure.

Example Embodiment

In the following, example embodiments for achieving a technique according to the present disclosure are described with reference to the drawings. A configuration, a numerical value, a flow of processing, a functional element, and the like described in the following example embodiments are merely one example. The technical scope of the present disclosure is not limited to the following description. Dividing constituent elements constituting each of the following example embodiments (e.g., dividing by a functional unit) is one example capable of achieving the example embodiment. A configuration capable of achieving each of the example embodiments is not limited to the following examples, and various configurations may be proposed. Constituent elements constituting each of the following example embodiments may be further divided, and one or more constituent elements constituting each of the following example embodiments may be integrated. In the following, a still image and a moving image (video) are generically referred to as an "image".

First Example Embodiment

Figure 1B:
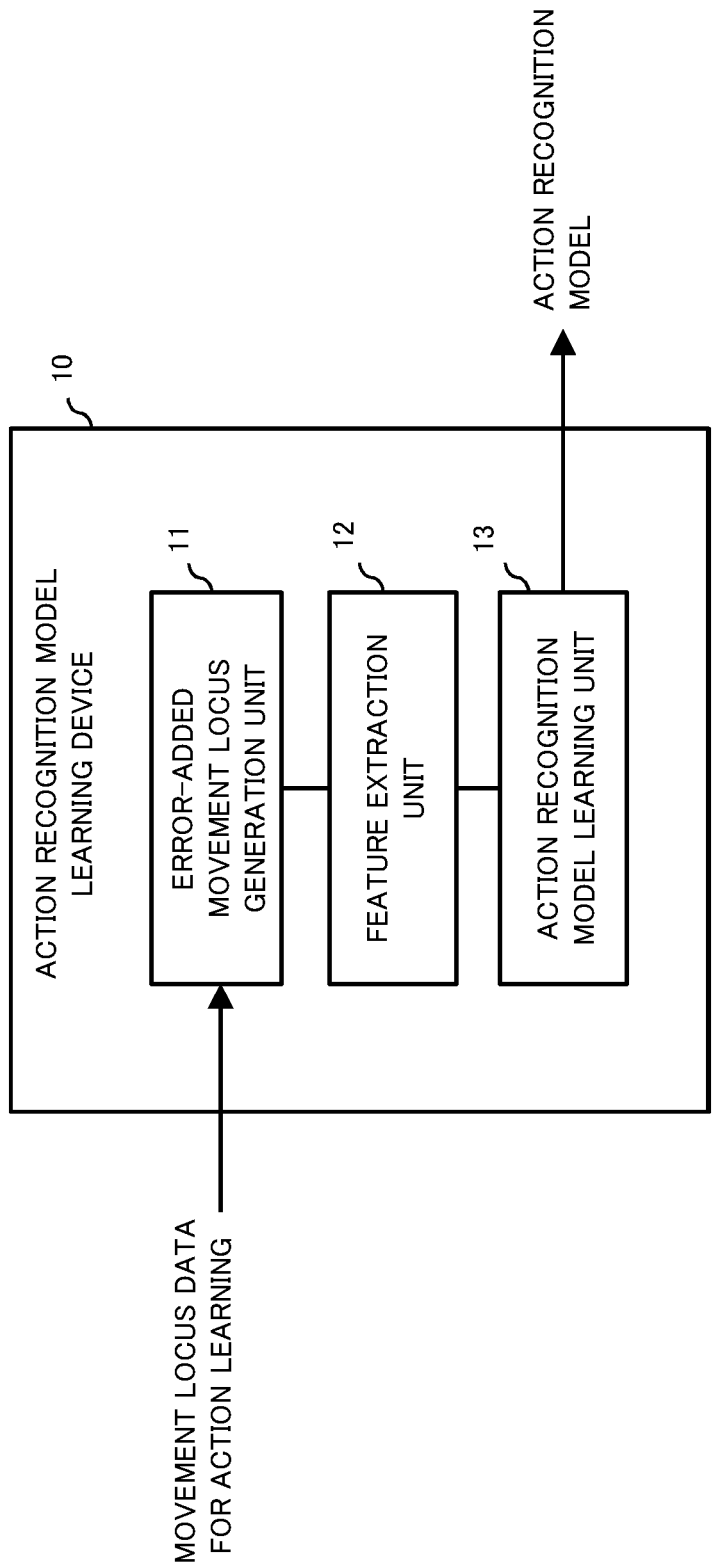
FIG. 1B is a block diagram exemplifying a functional configuration of the action recognition model learning device according to the first example embodiment of the present disclosure.

An action recognition model learning device 10 (model learning device) as a first example embodiment of a technique according to the present disclosure is described by using FIGS. 1A and 1B. The action recognition model learning device 10 according to the present example embodiment is a device for learning an action recognition model being a model for use in recognizing an action of a subject. In the technique according to the present disclosure, a subject is not specifically limited. As the subject, for example, a person (human), an animal, various mobile equipment (an automobile, a train, an aircraft, a ship, etc.), and the like may be included. In the following, for convenience of description, a case that the subject is a human (person) is described as a specific example. The present example embodiment, however, is not limited to the above (the similar idea is applied to the following example embodiments).

As illustrated in FIG. 1A, the action recognition model learning device 10 includes an error-added movement locus generation unit 11, and an action recognition model learning unit 13. As exemplified in FIG. 1B, the action recognition model learning device 10 may be configured to further include a feature extraction unit 12.

The error-added movement locus generation unit 11 generates error-added movement locus data by adding, to movement locus data for action learning, to which an action label is appended, an estimation error, which may be generated in automatic estimation of a movement locus by using an image. The movement locus data for action learning are data representing a movement locus of a subject (e.g., a person).

The action label is information representing an action of a subject (e.g., a person and the like) herein. For example, when a person is assumed as a subject, regarding an action of a certain person, "normal walking", "wandering", and the like may be appended to movement locus data for action learning, as an action label. The image may be, for example, an image (at least one of a moving image and a still image) captured by an image-capturing device such as a camera. In the following, for convenience of description, it is assumed that the error-added movement locus generation unit 11 adds, to movement locus data for action learning, an estimation error, which may be generated in automatic estimation of a movement locus by using an image (camera image) captured by a camera (the similar idea is applied to the following example embodiments). For example, the automatic estimation may include a technique for estimating a movement locus of a subject, based on an image captured by a camera and the like, by using an appropriate device (e.g. a computer device and the like). As one example of the technique, for example, a technique described in the following reference literature (Japanese Unexamined Patent Application Publication No. 2014-238674) may be employed. The present example embodiment, however, is not limited to the above, and another technique may be employed.

(Reference Literature) Japanese Unexamined Patent Application Publication No. 2014-238674

The action recognition model learning unit 13 learns a model (action recognition model) for recognizing an action of a subject, based on a movement locus of the subject, by using learning data generated based on at least movement locus data for action learning, and an action label.

When the action recognition model learning device 10 includes the feature extraction unit 12, the feature extraction unit 12 extracts (generates), from error-added movement locus data, a feature for use in recognizing an action of a subject (e.g. a person). In this case, the action recognition model learning unit 13 may learn a model for recognizing an action of a subject, based on a movement locus of the subject, by using a feature extracted by the feature extraction unit 12, and an action label.

In the action recognition model learning device 10 according to the present example embodiment, it is possible to learn an action recognition model capable of recognizing an action of a subject with high accuracy, based on a movement locus of the subject estimated by using an image. A reason for this is that the action recognition model learning device 10 generates error-added movement locus data by adding an estimation error to movement locus data (learning data) for action learning, and performs processing of learning an action recognition model by using the error-added movement locus data. Thus, the action recognition model learning device 10 is able to learn an action recognition model by including an estimation error generated in estimating a movement locus by using an image. Therefore, the action recognition model learning device 10 can learn an action recognition model capable of recognizing an action of a subject with enhanced accuracy.

Second Example Embodiment

In the following, an action recognition model learning device according to a second example embodiment of the present disclosure is described with reference to FIGS. 1C to 9.

Figure 1C:
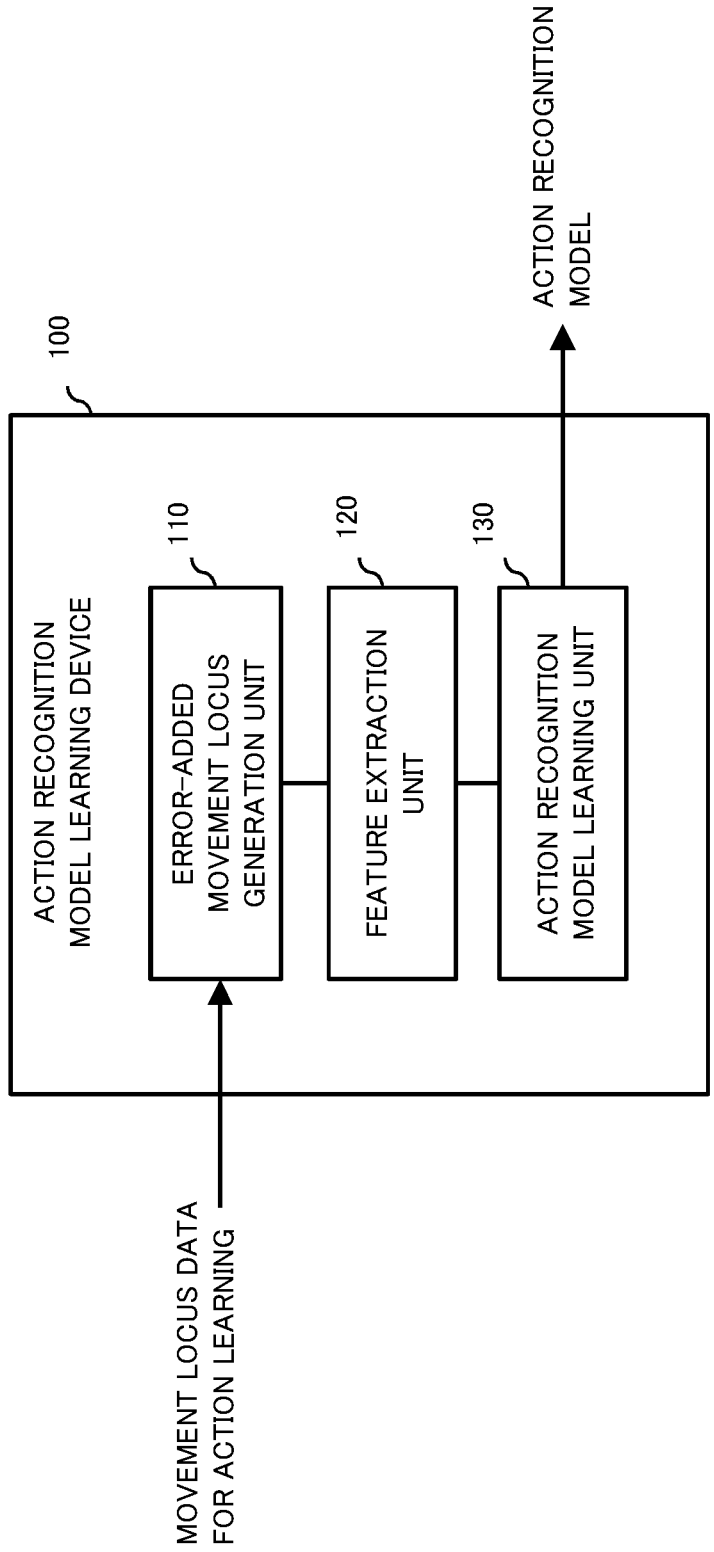
FIG. 1C is a block diagram exemplifying a functional configuration of an action recognition model learning device according to second and third example embodiments of the present disclosure.
Figure 2:
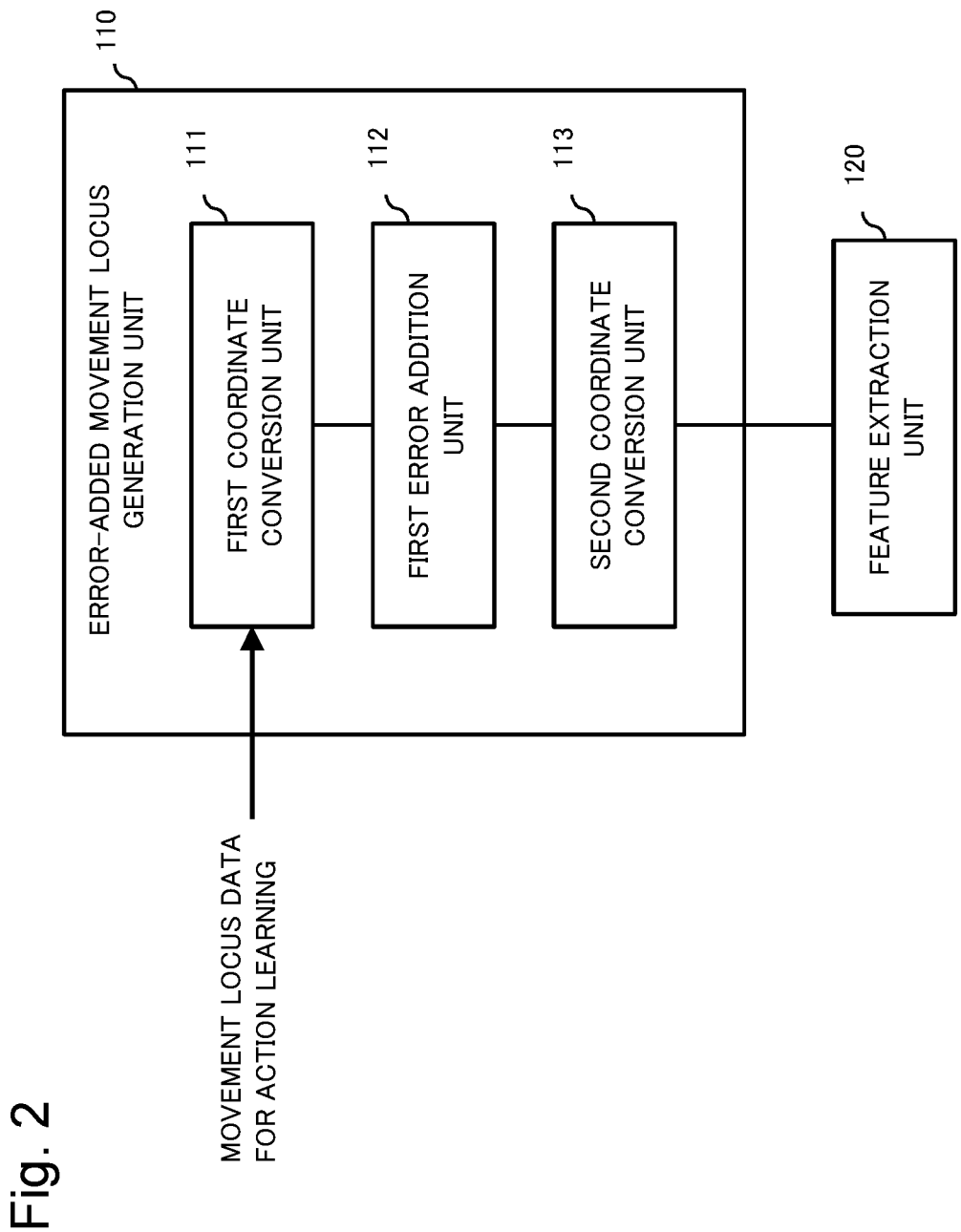
FIG. 2 is a block diagram exemplifying a functional configuration of an error-added movement locus generation unit according to the second example embodiment of the present disclosure.

FIGS. 1C and 2 are block diagrams exemplifying a functional configuration of an action recognition model learning device 100 according to the present example embodiment.

As exemplified in FIG. 1C, the action recognition model learning device 100 may be configured to include an error-added movement locus generation unit 110, a feature extraction unit 120, and an action recognition model learning unit 130. As exemplified in FIG. 2, the error-added movement locus generation unit 110 may be configured to include a first coordinate conversion unit 111, a first error addition unit 112, and a second coordinate conversion unit 113.

The error-added movement locus generation unit 110 according to the present example embodiment may be configured to achieve a function similar to the function of the error-added movement locus generation unit 11 according to the first example embodiment. The feature extraction unit 120 may be configured to achieve a function similar to the function of the feature extraction unit 12 according to the first example embodiment. The action recognition model learning unit 130 may be configured to achieve a function similar to the function of the action recognition model learning unit 13 according to the first example embodiment. In the following, each of the constituent elements constituting the action recognition model learning device 100 is described.

The error-added movement locus generation unit 110 generates error-added movement locus data by acquiring movement locus data for action learning, and adding an estimation error, which may be generated in automatic estimation of a movement locus by using a camera image. The error-added movement locus generation unit 110 includes the first coordinate conversion unit 111, the first error addition unit 112, and the second coordinate conversion unit 113.

The movement locus data for action learning are data in which information (hereinafter, referred to as an action label) representing a content of an action is appended, and are time-series data representing a correct position of a person. In the present example embodiment, a position of a person represented by movement locus data for action learning indicates a position of the person within a real space.

Figure 3:
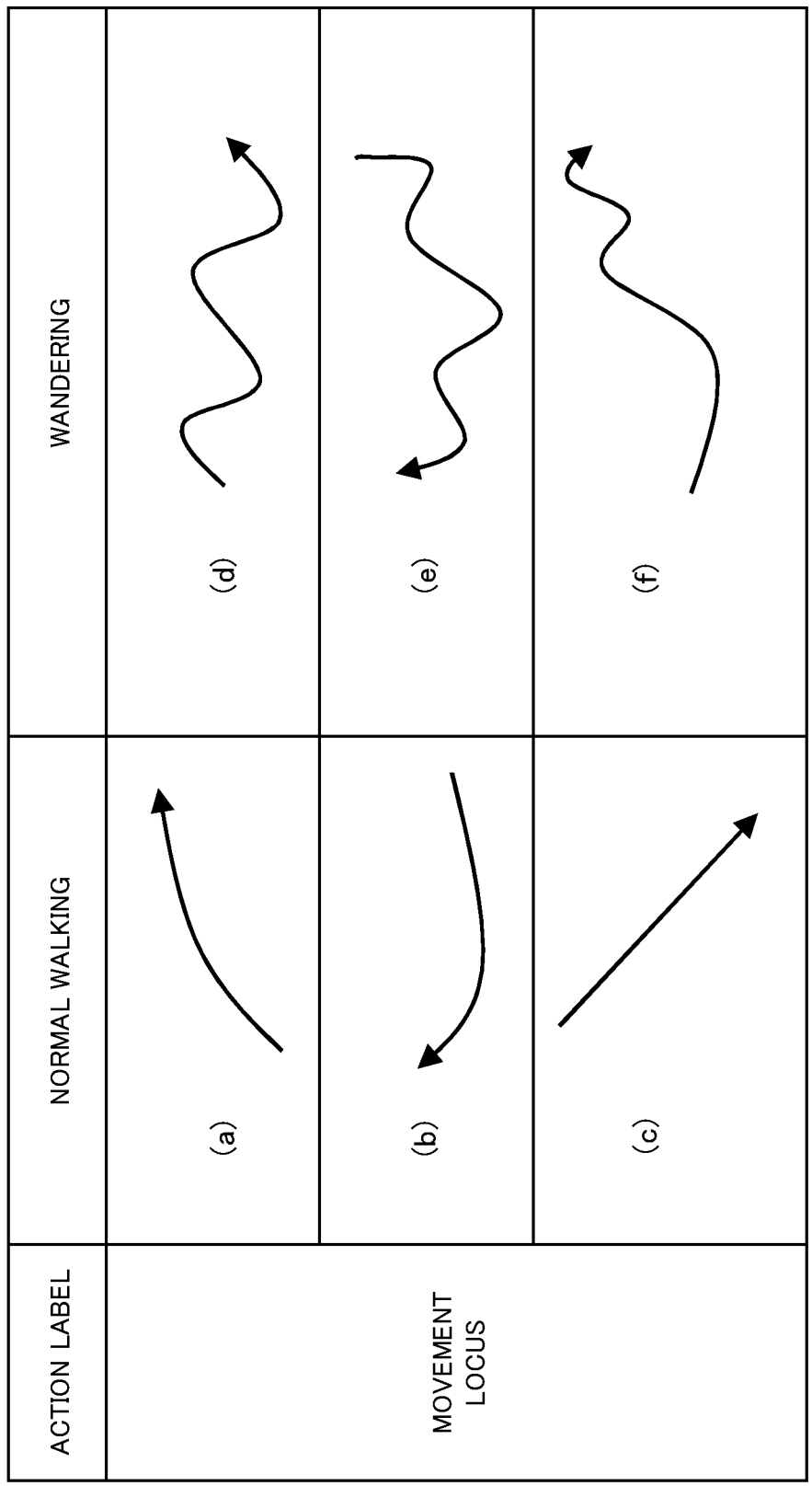
FIG. 3 is a diagram illustrating a specific example of movement locus data for action learning.

FIG. 3 illustrates one example of movement locus data for action learning. As exemplified in FIG. 3, movement locus data for action learning may include one or more pieces of movement locus data (from (a) to (f)). Hereinafter, movement locus data included in movement locus data for action learning may be simply referred to as movement locus data or a movement locus.

In FIG. 3, "normal walking" is appended to movement loci (a), (b), and (c) as an action label, and "wandering" is appended to movement loci (d), (e), and (f) as an action label. The movement loci ((a), (b), and (c)) to which an action label "normal walking" is appended have relatively less locus fluctuation. The movement loci ((d), (e), and (f)) to which an action label "wandering" is appended have relatively more locus fluctuation.

In order to acquire movement locus data for action learning, for example, a label may be manually appended to a foot position of a person within a camera image with respect to camera image data acquired by capturing the person, and coordinate conversion of the position within the camera image into a position within a real space may be performed. The coordinate conversion can be calculated by using camera parameters representing a set position, a set angle, a lens characteristic, and the like of a camera. A method for acquiring movement locus data for action learning is not limited to the above. For example, it is possible to employ another method capable of accurately measuring a position of a person within a real space with laser positioning, a pressure sensor installed on the ground, and the like.

A generator of movement locus data for action learning can generate, for example, action locus data included in movement locus data for action learning by preparing a plurality of pieces of camera captured data acquired by capturing an action of a person in advance, and performing coordinate conversion after appending a label to each piece of the camera captured data according to a method as described above. The movement locus data for action learning may be stored in the action recognition model learning device 100, for example. The movement locus data for action learning may be stored in a device other than the action recognition model learning device 100, or may be provided to the action recognition model learning device 100 as necessary via various communication lines, a recording medium, and the like, for example.

The first coordinate conversion unit 111 converts the movement locus data for action learning into data representing a movement locus within a camera image, and outputs the data. In the following description, a coordinate system for representing a position within a real space is referred to as a "world coordinate system", and a coordinate system for representing a position within a camera image is referred to as a "camera image coordinate system".

Figure 4:
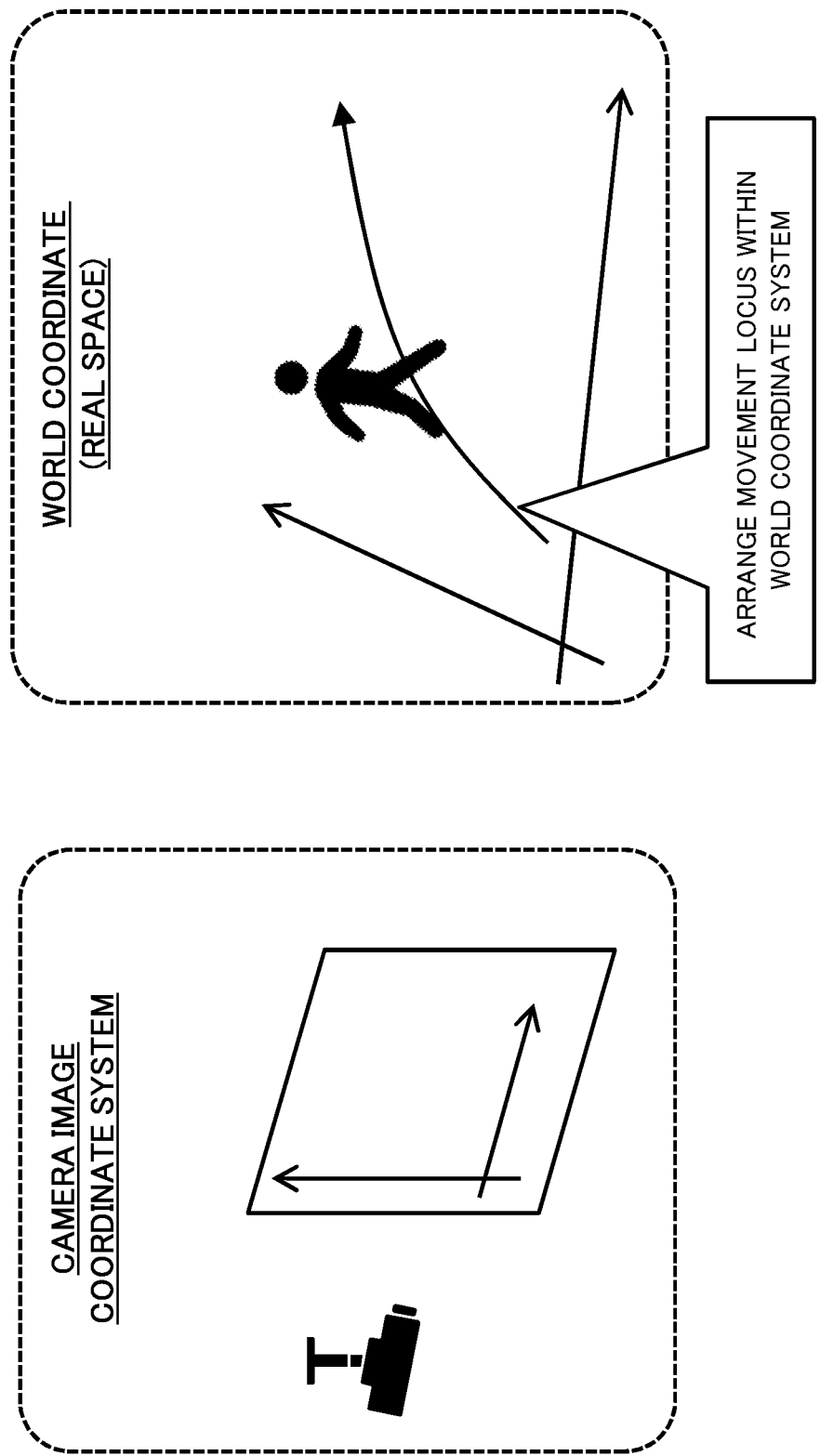
FIG. 4 is a diagram illustrating a processing content of a first coordinate conversion unit according to the second example embodiment of the present disclosure.

FIG. 4 is an explanatory diagram schematically illustrating a state in which movement locus data for action learning exemplified in (a) of FIG. 3 are arranged within a world coordinate system. At this occasion, although a virtual camera is also arranged within the world coordinate system, a set position and a set angle of the camera may be selected as necessary. For example, when an action recognition model independent of an installation place of a camera is learned, the (virtual) camera may be arranged at a random place.

Coordinate axes illustrated in FIG. 4 are selectable as necessary. The coordinate axes may be, for example, coordinate axes representing two-dimensional or three-dimensional absolute coordinates, or may be coordinate axes representing polar coordinates. The movement locus data may be arranged as two-dimensional data, or may be arranged as three-dimensional data within the world coordinate system.

Figure 5:
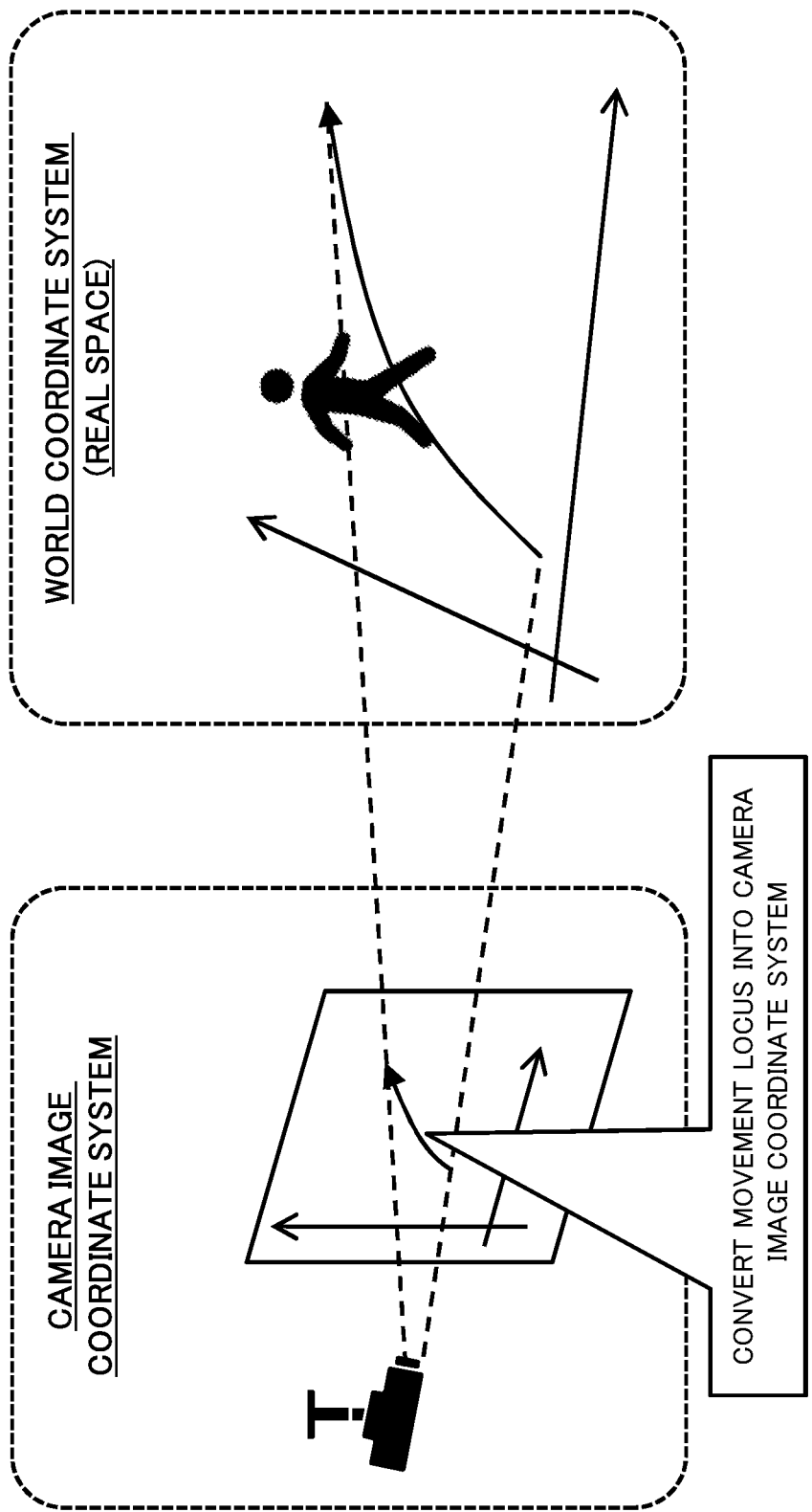
FIG. 5 is a diagram illustrating a processing content of the first coordinate conversion unit according to the second example embodiment of the present disclosure.

FIG. 5 is an explanatory diagram schematically illustrating a processing content of coordinate conversion by the first coordinate conversion unit 111. The first coordinate conversion unit 111 converts a movement locus arranged within a world coordinate system into movement locus data within a camera image coordinate system of a virtual camera. This conversion can be calculated by using camera parameters representing a set position, a set angle, a lens characteristic, and the like of the virtual camera.

The first error addition unit 112 outputs data acquired by adding, to movement locus data to be output by the first coordinate conversion unit 111, an estimation error, which may be generated in automatic estimation of a position of a person within a camera image. For example, the first error addition unit 112 adds, to one or more points on a movement locus within a camera image coordinate system, a Gaussian noise having a variance of a specific magnitude determined in advance. This processing is equivalent to simulating a random estimation error generated in estimating a position of a person within a camera image. A variance of a Gaussian noise to be added may be changed according to a distance between a camera and a person. Noise to be added to movement locus data according to the present example embodiment is not limited to a Gaussian noise, and noise other than the above may be added as necessary.

Figure 6:
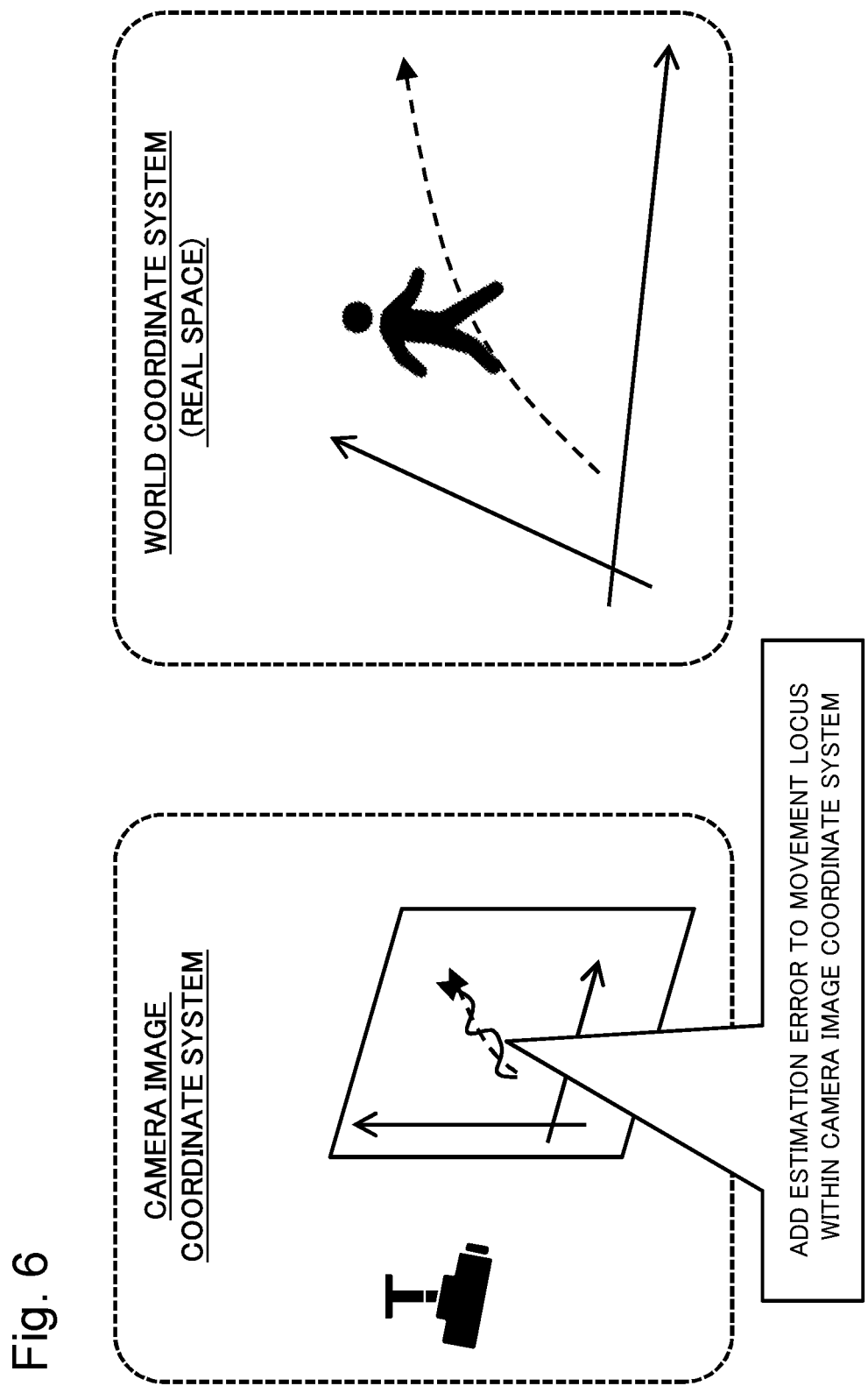
FIG. 6 is a diagram illustrating a processing content of a first error addition unit according to the second example embodiment of the present disclosure.

FIG. 6 is an explanatory diagram schematically illustrating a processing content of error addition by the first error addition unit 112. By adding an error to a movement locus by the first error addition unit 112, subtle fluctuation is added to a movement locus within a camera coordinate system.

The second coordinate conversion unit 113 generates error-added movement locus data by converting movement locus data to be output by the first error addition unit 112 into data representing a movement locus within a real space, and outputs the data.

Figure 7:
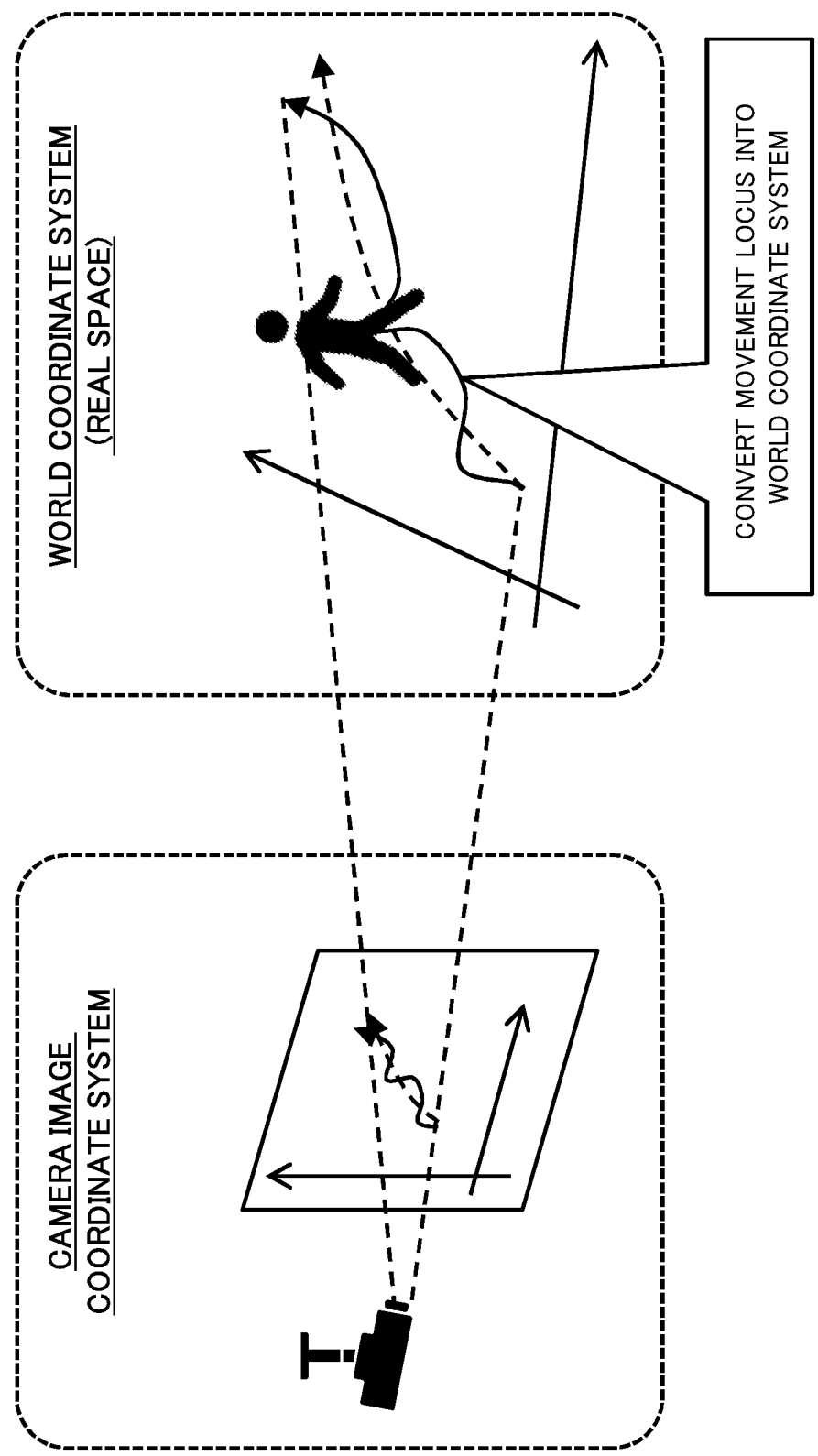
FIG. 7 is a diagram illustrating a processing content of a second coordinate conversion unit according to the second example embodiment of the present disclosure.

FIG. 7 is an explanatory diagram schematically illustrating a processing content of coordinate conversion by the second coordinate conversion unit 113. The second coordinate conversion unit 113 generates error-added movement locus data within a world coordinate system, from data generated by the first error addition unit 112, and being data within a camera coordinate system reflecting an error generated in automatic estimation of a position of a person within a camera image.

The feature extraction unit 120 extracts, from the error-added movement locus data within the world coordinate system to be output by the second coordinate conversion unit 113, a feature for use in recognizing an action of a person. As the feature, for example, it is possible to use a time-series feature such as a velocity vector or an acceleration vector to be acquired by differentiating a movement locus, and a movement average of these vectors in a time direction. It is known that these features are useful for the purpose of recognizing an action of a person. The feature is not limited to the above, and another feature representing time-series data may be employed.

The action recognition model learning unit 130 learns an action recognition model for recognizing an action of a person, based on a movement locus of the person, by using a feature to be output by the feature extraction unit 120, and an action label appended to movement locus data for action learning (specifically, an action label appended to a movement locus included in movement locus data for action learning). The action recognition model learning unit 130 may output a learned model.

As the action recognition model, for example, a recurrent neural network (RNN) may be employed. A neural network is, for example, employed in a sorting problem in which a time-series feature is used as an input. However, the action recognition model is not limited to a neural network. For example, the number of dimensions of a feature may be determined by calculating a statistical amount such as an average, a variance, and a maximum value in a time direction with respect to a time-series feature, and then, various types of discriminators for use in a pattern recognition field such as a support vector machine may be employed as the action recognition model.

The action recognition model learning unit 130 is able to select, as necessary, an appropriate learning algorithm including a well-known art according to a type of action recognition model to be learned. For example, the action recognition model learning unit 130 may employ, as a learning algorithm for learning a model such as an RNN and a support vector machine, a learning algorithm to be generally used in the present technical field.

Figure 8:
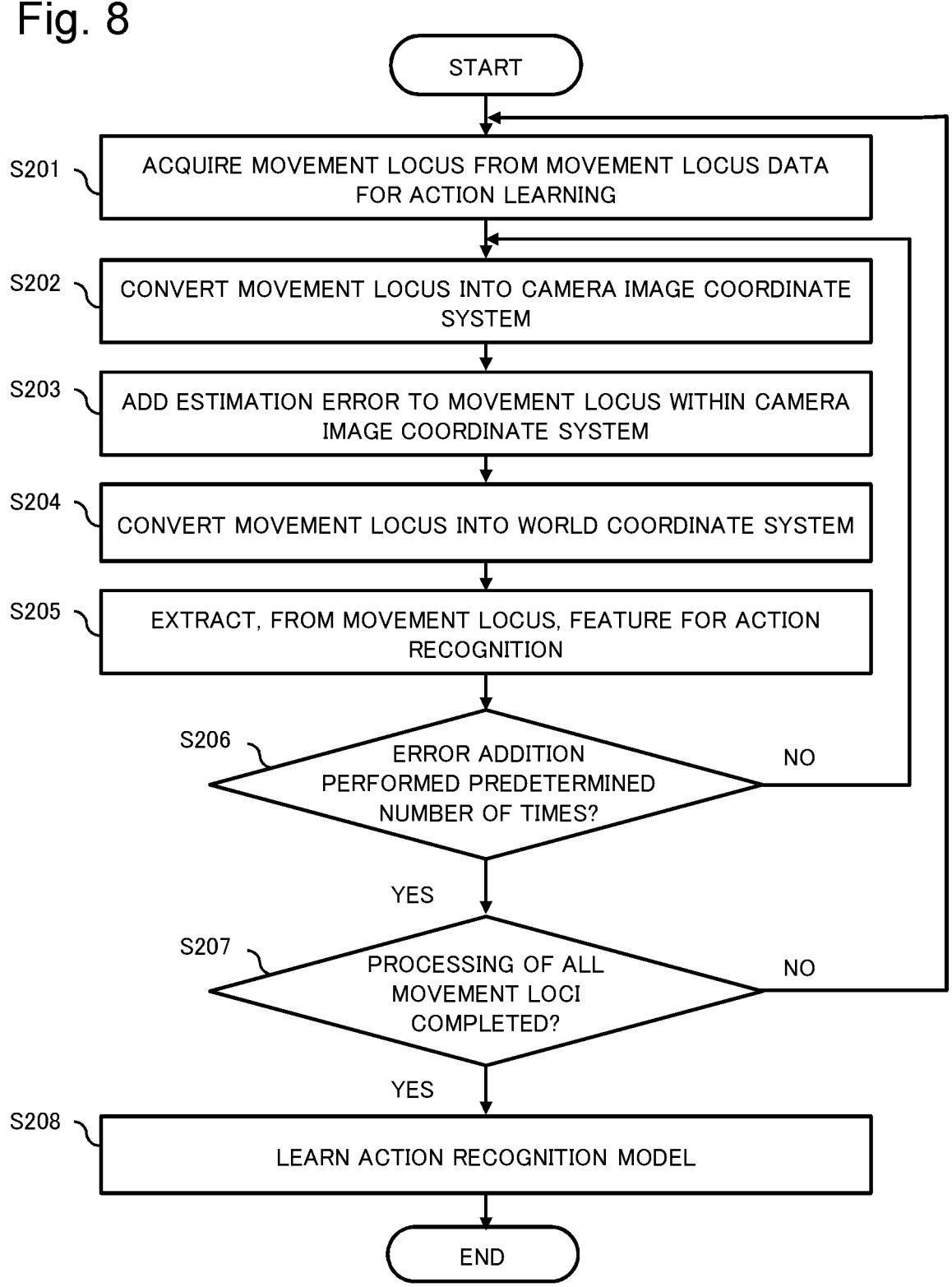
FIG. 8 is a flowchart illustrating one example of a processing procedure of the action recognition model learning device according to the second example embodiment of the present disclosure.

FIG. 8 is a flowchart illustrating one example of an operation of the action recognition model learning device 100 according to the present example embodiment.

The action recognition model learning device 100 acquires a movement locus from movement locus data for action learning, and arranges the movement locus within a world coordinate system (Step S201). As described above, at this occasion, the error-added movement locus generation unit 110 may read the movement locus from the given movement locus data for action learning, and arrange the movement locus within the world coordinate system.

The action recognition model learning device 100 converts the movement locus arranged within the world coordinate system into a movement locus within a camera image coordinate system of a virtual camera (Step S202). As described above, at this occasion, the error-added movement locus generation unit 110 (first coordinate conversion unit 111) may convert the movement locus acquired from the movement locus data for action learning into data representing a movement locus within the camera image coordinate system.

Within the camera image coordinate system, the action recognition model learning device 100 adds, to the movement locus, an estimation error, which may be generated in automatic estimation of a position of a person within a camera image (Step S203). As described above, at this occasion, the error-added movement locus generation unit 110 (first error addition unit 112) may add an estimation error (e.g., a Gaussian noise) to the data representing the movement locus within the camera image coordinate system.

The action recognition model learning device 100 converts the movement locus within the camera image coordinate system in which the estimation error is added, into a movement locus within the world coordinate system, and outputs the movement locus as error-added movement locus data (Step S204).

The action recognition model learning device 100 extracts, from the error-added movement locus data, a feature for use in recognizing an action of the person (Step S205). As described above, at this occasion, the feature extraction unit 120 may generate a feature from the error-added movement locus data.

The action recognition model learning device 100 determines whether processing from Step S202 to Step S205 has been performed a predetermined number of times with respect to the movement locus acquired from the movement locus data for action learning (Step S206).

When these processing has not been performed the predetermined number of times (NO in Step S206), the above-described processing from Step S202 to Step S205 is performed again with respect to the same movement locus. At this occasion, the first error addition unit 112 may stochastically change the estimation error to be added to the movement locus data, for example. Thus, the first error addition unit 112 can control in such a way that the error-added movement locus data to be acquired, and the feature thereof change each time. At this occasion, the first error addition unit 112, for example, may stochastically generate a Gaussian noise each time, and add the Gaussian noise to the movement locus data.

By the above-described iteration processing, the first error addition unit 112 can generate a movement locus having various estimation errors. Specifically, the first error addition unit 112 can generate, from one piece of movement locus data, learning data of a plurality of patterns (movement locus data to which an estimation error is added), for example.

Thus, the action recognition model learning device 100 can learn an action recognition model to be described later by using learning data in which various estimation errors are presumed. Therefore, the action recognition model learning device 100 can learn a more robust action recognition model with respect to an estimation error of a movement locus.

When the determination result in Step S206 is YES, the action recognition model learning device 100 determines whether processing from Step S201 to Step S206 has completed with respect to all movement loci included in the movement locus data for action learning (Step S207).

When an unprocessed movement locus remains (NO in Step S207), the above-described processing from Step S201 to Step S206 is performed with respect to the unprocessed movement locus.

When the determination result in Step S207 is YES, the action recognition model learning device 100 learns an action recognition model for recognizing an action of the person, based on a movement locus of the person, by using, as learning data, a feature extracted from a movement locus in which various estimation errors are added to all movement loci included in the movement locus data for action learning, and an action label appended to each of the movement loci (Step S208). At this occasion, the action recognition model learning unit 130 may learn an action recognition model (e.g., an RNN model) by using the feature generated as described above. The action recognition model learning unit 130 may output the learned action recognition model.

In the present example embodiment, the above-described configuration enables learning an action recognition model capable of recognizing an action of a person with high accuracy, based on a movement locus of the person estimated by using a camera image. A reason for this is that the action recognition model learning device 100 according to the present example embodiment learns an action recognition model by generating movement locus data, taking into consideration an estimation error included in a movement locus of a person to be estimated by using a camera image, and using generated error-added movement locus data as learning data.

When a movement locus of a person is estimated by using a camera image, an estimation error of the movement locus occurs in specifying a position of the person within the camera image. Specifically, an estimation error is included in a movement locus of a person estimated from a camera image. Therefore, when an action is recognized by using the movement locus as input data, the estimation error included in the input data (movement locus) affects recognition accuracy.

The action recognition model learning device 100 according to the present example embodiment converts a movement locus of a person from a world coordinate system into a camera image coordinate system, and then, adds an estimation error to the movement locus. Thus, the action recognition model learning device 100 can add, to a movement locus, an error directly simulating a feature of an error generated in specifying a position of a person within a camera image. Therefore, the action recognition model learning device 100 is able to learn an action recognition model by using learning data (movement locus data) that appropriately reproduces an estimation error of a movement locus. Consequently, the action recognition model learning device 100 can learn a high-accuracy action recognition model (specifically, an action recognition model capable of determining an action with high accuracy).

An advantageous effect to be achieved by the present example embodiment is specifically described with reference to FIG. 9. An upper portion of FIG. 9 (901 in FIG. 9) illustrates correct (accurate) movement loci of a person in "normal walking" or "wandering" within a world coordinate system. However, when a movement locus of a moving body is automatically estimated from a camera image acquired by capturing the moving body (person) having these movement loci, movement loci including an estimation error as illustrated in a lower portion of FIG. 9 (902 in FIG. 9) are acquired.

Figure 9:
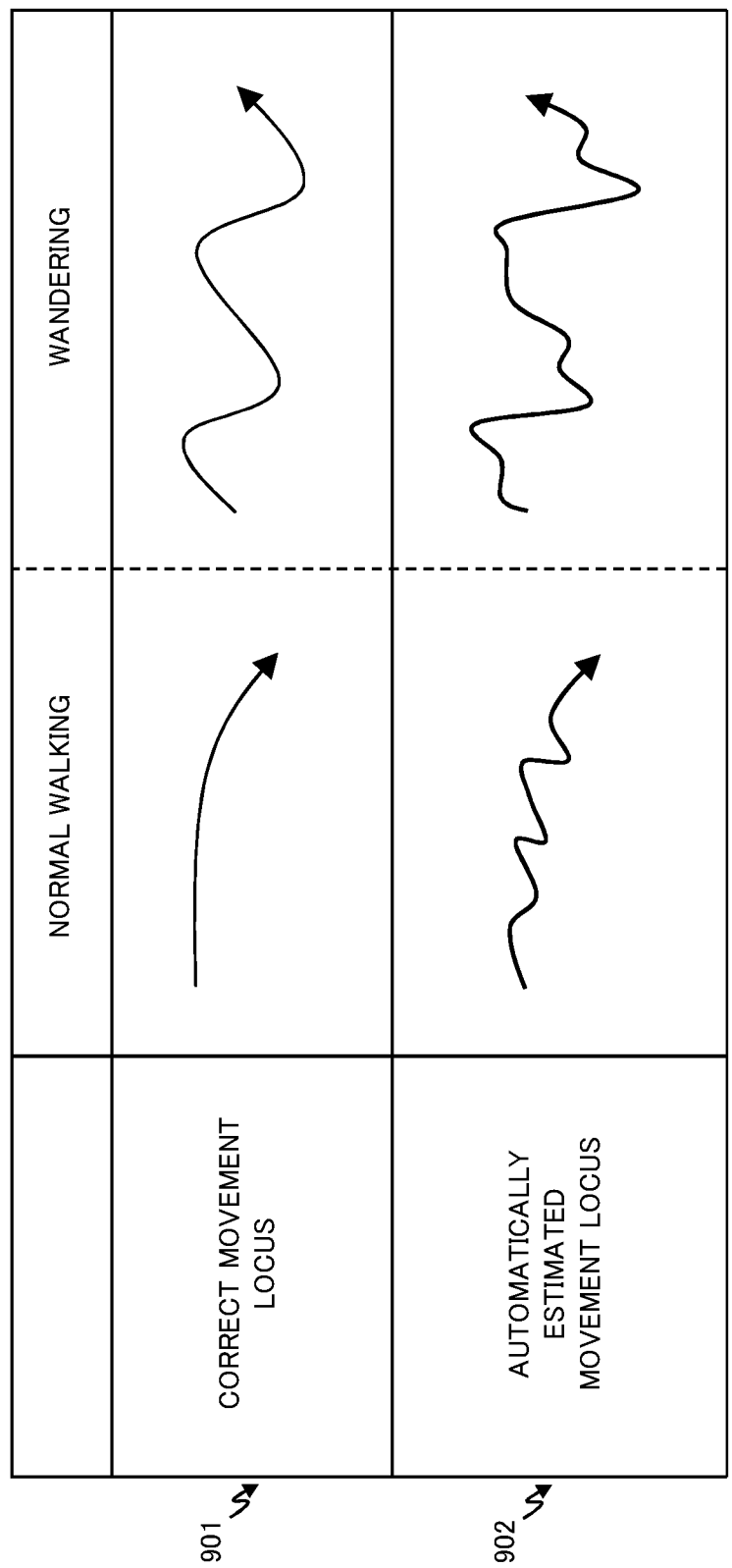
FIG. 9 is a diagram illustrating an advantageous effect of the action recognition model learning device according to the second example embodiment of the present disclosure.

For example, it is assumed that a movement locus automatically estimated from a camera image is recognized by using an action recognition model learned by using only correct movement loci as exemplified in the upper portion of FIG. 9 as learning data. In this case, regarding a movement locus in which fluctuation is not included, the learned action recognition model can relatively correctly recognize (determine) an action indicated by the movement locus. On the other hand, when a movement locus including an estimation error is given to an action recognition model learned by using such learning data, there is a possibility of becoming lower in recognition accuracy of an action.

In contrast, the action recognition model learning device 100 according to the present example embodiment generates, from the correct movement loci in the upper portion of FIG. 9, movement loci simulating the automatically estimated movement loci in the lower portion of FIG. 9, and uses, as learning data, the generated movement loci (specifically, movement loci simulating an estimation error). Therefore, the action recognition model learning device 100 according to the present example embodiment can learn a model capable of recognizing an action with high accuracy.

Third Example Embodiment

In the following, an action recognition model learning device according to a third example embodiment of the present disclosure is described with reference to FIGS. 10 to 14.

An action recognition model learning device 100 according to the present example embodiment is different from that according to the above-described second example embodiment in a processing content of an error-added movement locus generation unit 110. The other configurations and operations may be similar to those in the second example embodiment.

Figure 10:
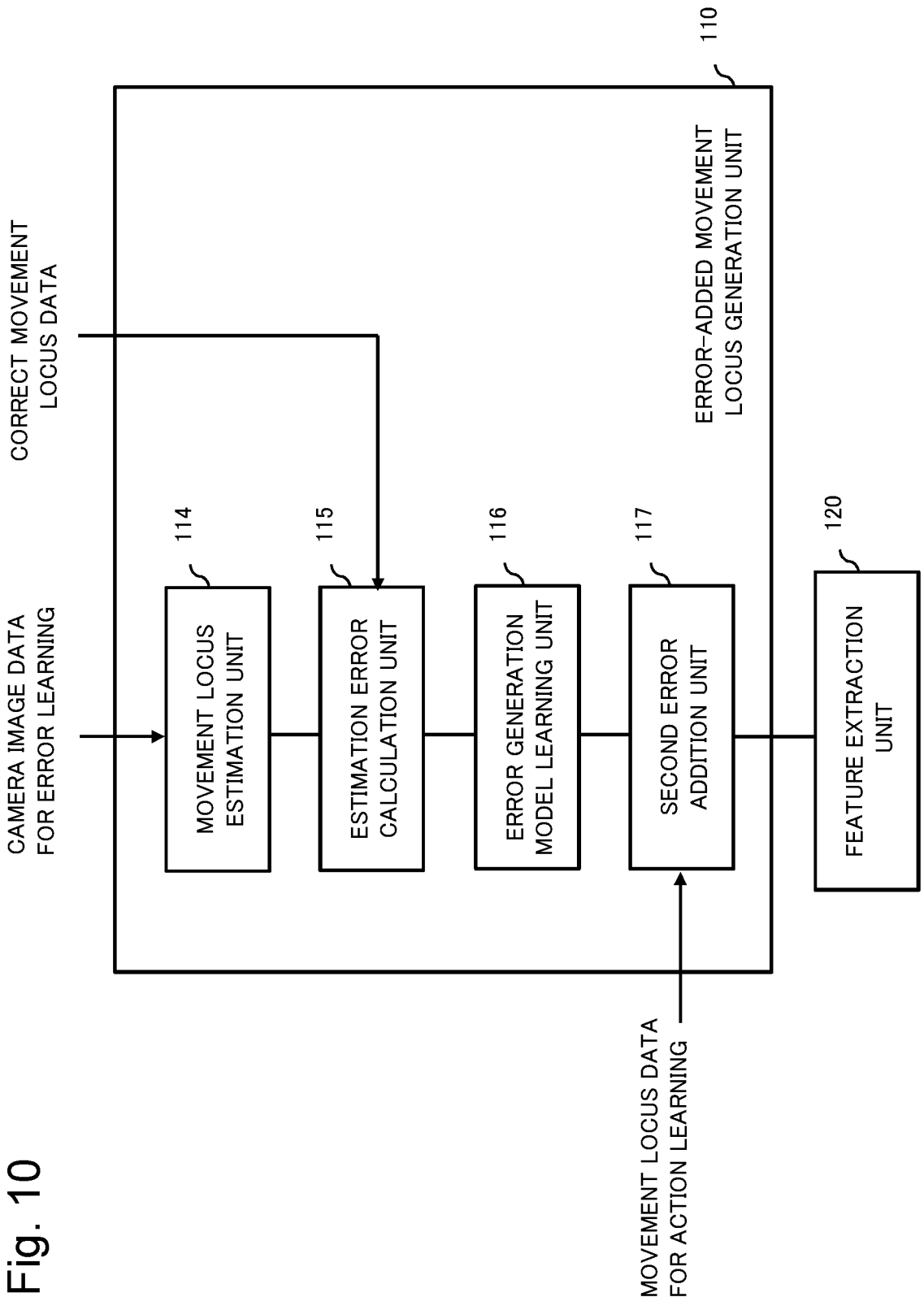
FIG. 10 is a block diagram exemplifying a functional configuration of an error-added movement locus generation unit according to the third example embodiment of the present disclosure.

FIG. 10 is a block diagram illustrating a functional configuration of an error-added movement locus generation unit 110 according to the present example embodiment. The error-added movement locus generation unit 110 according to the present example embodiment includes a movement locus estimation unit 114, an estimation error calculation unit 115, an error generation model learning unit 116, and a second error addition unit 117. In the following, these constituent elements are described.

The movement locus estimation unit 114 automatically estimates a movement locus of a person within an image by using camera image data for error learning (to be described later). As a movement locus automatic estimation method, the movement locus estimation unit 114 detects an area of a person within a camera image, and estimates a foot position of the person, based on the detected area of the person, for example. Next, the movement locus estimation unit 114 estimates a movement locus of the person within a real space by converting the foot position within the camera image into a foot position within the real space by using camera parameters representing a set position, a set angle, a lens characteristic, and the like of a camera. The movement locus automatic estimation method to be employed by the movement locus estimation unit 114 may be desirably the same as an automatic estimation method for use in estimating a movement locus of a person in a situation in which an action of a person is recognized (determined) by actually applying an action recognition model learned by the action recognition model learning device 100. Specifically, a movement locus automatic estimation method to be employed by the movement locus estimation unit 114 may be the same as an automatic estimation method for generating movement locus data to be input to a learned action recognition model in recognizing an action of a person.

Camera image data for error learning are image data acquired by capturing a state that many people come and go by using an image-capturing device such as a camera. Correct movement locus data representing a correct movement locus of each person is appended to each person within the camera image data for error learning.

In order to acquire correct movement locus data, a creator of the data manually append a label, to camera image data for error learning, a foot position of the person within a camera image, and may perform coordinate conversion of the position within the camera image into a position within a real space, for example. The coordinate conversion can be calculated by using camera parameters representing a set position, a set angle, a lens characteristic, and the like of a camera. A method for acquiring correct movement locus data is not limited to the above. For example, it is possible to employ another method capable of accurately measuring a position of a person within a real space with laser positioning, a pressure sensor installed on the ground, and the like.

Camera image data for error learning and correct movement locus data may be provided as necessary to the action recognition model learning device 100 via a communication network, a recording medium, and the like, or may be accumulated (stored) in the action recognition model learning device 100.

The camera image data for error learning may be desirably image data captured in a condition approximate to a condition in which image data for use in actually applying an action recognition model (specifically, in recognizing (determining) an action by using a learned action recognition model). For example, when a situation in which image data to which an action recognition model is actually applied are captured is an environment crowded with many people, the camera image data for error learning may also be desirably image data captured in an environment crowded with many people. As a capturing condition of the image data, for example, the number, a moving speed, a capturing time, a capturing place, a condition of ambient light, a background, and the like of subjects (such as persons) to be captured may be considered.

Movement locus data for action learning and correct movement locus data may be data different from each other. As described in the second example embodiment, an action label is appended to movement locus data for action learning, and is used in learning an action recognition model. On the other hand, correct movement locus data are data accompanied by camera image data for error learning. As described later, the correct movement locus data are data for use in learning a model for generating an estimation error generated when a movement locus is automatically estimated from image data. Therefore, an action label does not have to be appended to the correct movement locus data.

Figure 11:
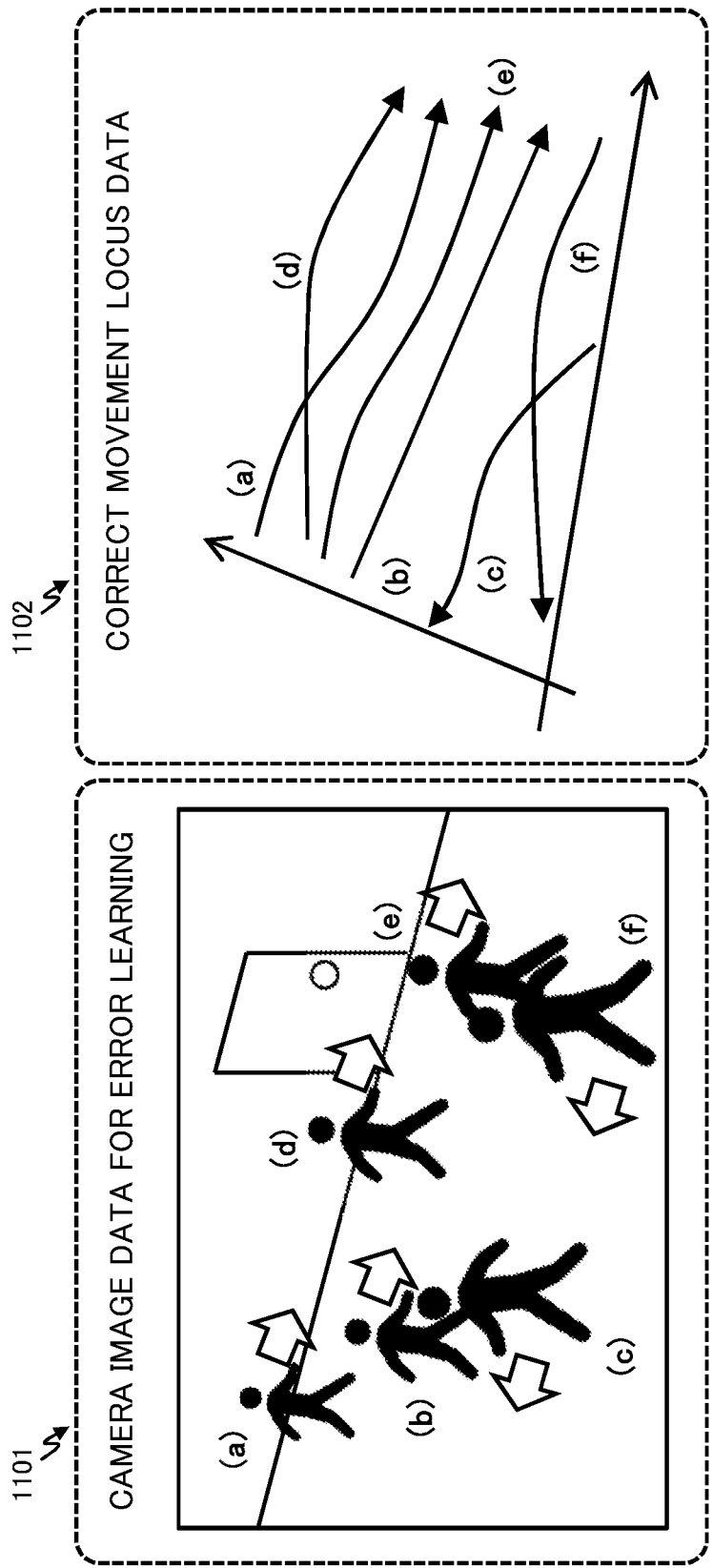
FIG. 11 is a diagram illustrating a specific example of camera image data for error learning, and correct movement locus data associated with the image data.

FIG. 11 is an explanatory diagram illustrating one example of camera image data for error learning, and correct movement locus data accompanied by the camera image data. A left portion in FIG. 11 (1101 in FIG. 11) exemplifies image data representing that persons (a), (b), (c), (d), (e), and (f) come and go, and a right portion in FIG. 11 (1102 in FIG. 11) illustrates correct movement locus data within a world coordinate system of each person. In this case, correct movement locus data of each person may be manually appended.

The estimation error calculation unit 115 calculates, as an estimation error, a difference between correct movement locus data relating to a person captured in camera image data for error learning, and movement locus data of the person, which is automatically estimated by the movement locus estimation unit 114. For example, it is assumed that correct movement locus data of a frame relating to a certain person and having a length T are (x1, y1), (x2, y2), ..., (xt, yt), ..., and (xT, yT). Further, it is assumed that movement locus data automatically estimated with respect to the same movement locus are (x1', y1'), (x2', y2'), ..., (xt', yt'), ..., and (xT', yT'). In this case, time-series data of an estimation error (estimation error vector) to be calculated by the estimation error calculation unit 115 are calculated as (e1, e2, ..., et, ..., eT)=((x1'-x1, y1'-y1), (x2'-x2, y2'-y2), ..., (xt'-xt, yt'-yt), ..., (xT'-xT, yT'-yT)). The frame number T may be selected as necessary. A timewise length of one frame may be selected as necessary.

The error generation model learning unit 116 learns an error generation model capable of generating time-series data of an estimation error by using, as learning data, time-series data of an estimation error calculated by the estimation error calculation unit 115. As the error generation model, for example, it is possible to use an ergodic hidden Markov model (HMM) for stochastically outputting time-series data of an estimation error.

The ergodic HMM is an error generation model capable of freely transiting between states according to a state transition probability "a_ij" as time elapses. The ergodic HMM outputs an estimation error according to an output probability distribution "f(e|λi)" inherent to a staying state "i" at each time. As the output probability distribution, for example, it is possible to employ a multi-dimensional normal distribution.

Figure 12:
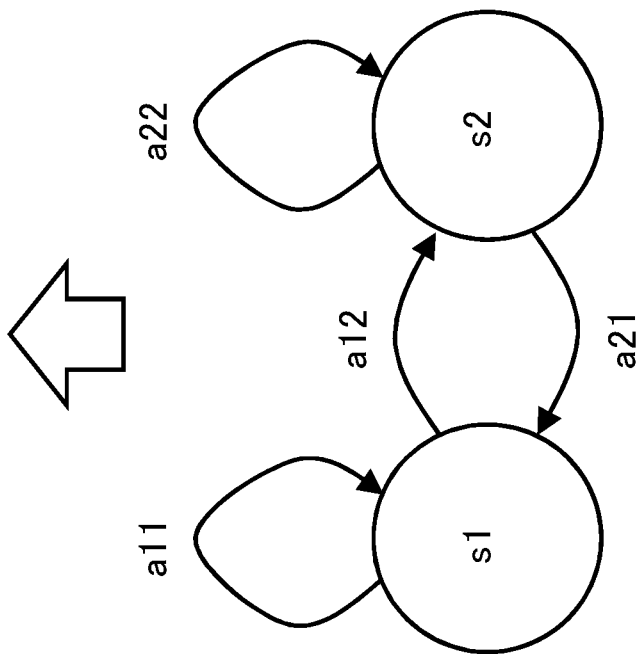
FIG. 12 is a diagram illustrating a specific example of an error generation model according to the third example embodiment of the present disclosure.

FIG. 12 is an explanatory diagram illustrating an example of a 2-state ergodic HMM. As a parameter of the ergodic HMM, parameters of a state transition probability and an output probability distribution may be learned by using an existing method such as Baum-Wlch method by using, as learning data, time-series data of an estimation error calculated by the estimation error calculation unit 115.

Figure 13:
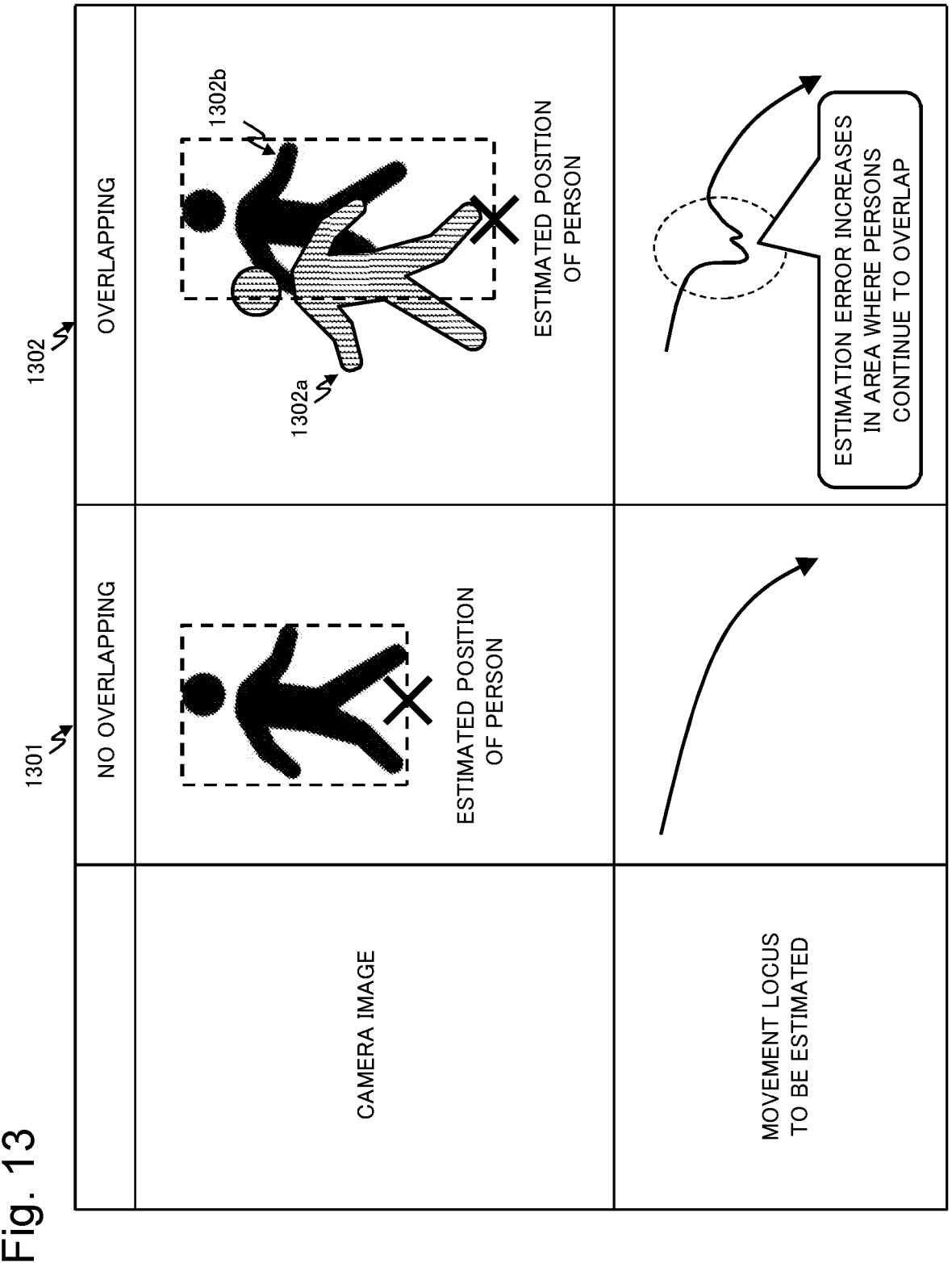
FIG. 13 is a diagram illustrating a feature of an estimation error of a movement locus, which is generated when a plurality of persons overlap.

An advantageous effect of employing an ergodic HMM as an error generation model is described by using FIG. 13. When a movement locus of a person is automatically estimated by using a camera image, a large estimation error is likely to occur, when a plurality of persons overlap in the camera image. An example in which there is "no overlapping" in a camera image exemplified in a left portion of FIG. 13 (1301 in FIG. 13) is an example in which one person is captured alone in a camera image. A rectangular area indicated by the broken line represents an estimated area of the person (an area in which the person is estimated to be captured). The "X" mark represents a foot position of the estimated person (a position which is estimated to be a foot position of the person). When persons do not overlap within the image, a position of the person is substantially correctly estimated, and an estimation error of a movement locus is approximate to a normal distribution in which a variance is small and isotropic.

On the other hand, an example in which there is "overlapping" in a camera image exemplified in a right portion of FIG. 13 (1302 in FIG. 13) is an example in which two persons overlapping each other are captured in the camera image. In this case, an area of a rear person (1302b in FIG. 13) is erroneously detected in such a way that the area is widened downward in the drawing due to an influence of a front person (1302a in FIG. 13). Consequently, the estimated foot position includes a relatively large error. In this way, when persons overlap each other, an estimation error of a position of the person tends to increase. Further, an estimation error in a direction of a straight line connecting a camera and the person also tends to increase.

Thus, it is clear that a property of an estimation error in estimating a movement locus of a person by using a camera image differs between a case where a single person is captured by a camera, and a case where a plurality of persons are captured in an overlapping manner. Further, it is conceived that a state in which a person is captured alone by a camera, and a state that a plurality of persons are captured by the camera in an overlapping manner may be continued for a certain period of time, or may be alternately switched (states are transited) while keeping each of the states.

The ergodic HMM can express such a feature (property) inherent to an estimation error of a movement locus. Therefore, employing the ergodic HMM enables learning a generation model in which an estimation error is modelled with high accuracy (in other words, a generation model capable of generating an estimation error with high accuracy). In order to express whether persons overlap, for example, the 2-state ergodic HMM illustrated in FIG. 12 may be employed. It is expected that learning progresses in such a way that each of states s1 and s2 represents either of "a state that persons do not overlap", and "a state that persons overlap". When another factor by which a tendency of an estimation error of a movement locus greatly changes is present, an ergodic HMM in which the number of states is further increased may be employed.

The second error addition unit 117 generates and outputs error-added movement locus data by adding, to movement locus data for action learning, an estimation error generated by an error generation model. Specifically, the second error addition unit 117 generates time-series data of an estimation error having the same length as movement locus data by using an error generation model with respect to movement locus data within movement locus data for action learning, for example. The second error addition unit 117 generates error-added movement locus data by adding the generated estimation error to the movement locus data.

Specifically, the error-added movement locus generation unit 110 (first error addition unit 112) according to the above-described first example embodiment generates error-added movement locus data by adding, to movement locus data for action learning, a Gaussian noise having a variance of a certain specific magnitude. In contrast, the second error addition unit 117 according to the present example embodiment generates error-added movement locus data by adding, to movement locus data for action learning, an estimation error generated by an error generation model. Thus, the second error addition unit 117 according to the present example embodiment can generate error-added movement locus data in which an estimation error is simulated with enhanced accuracy.

Figure 14:
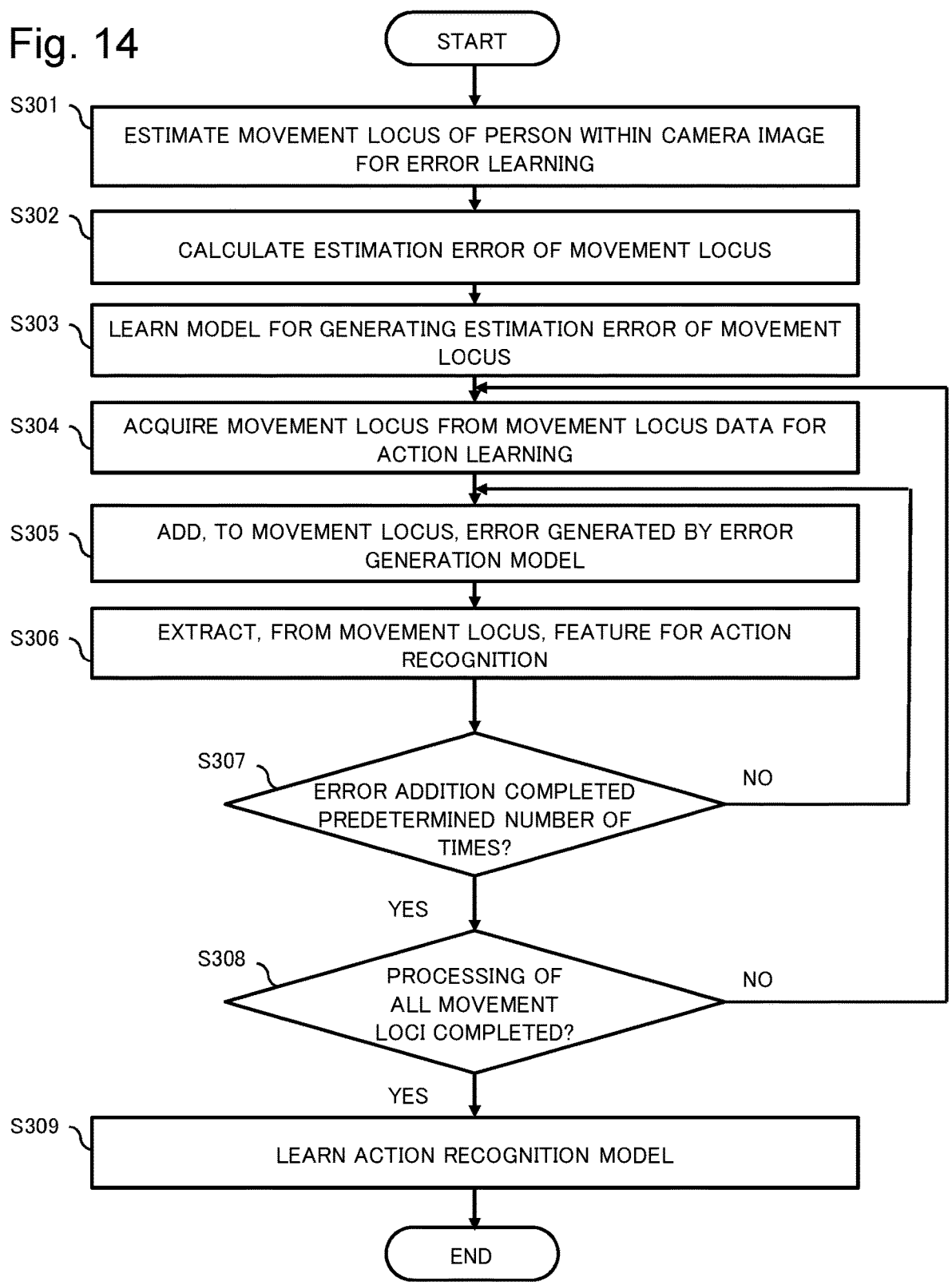
FIG. 14 is a flowchart illustrating one example of a processing procedure of the action recognition model learning device according to the third example embodiment of the present disclosure.

In the following, an operation of the action recognition model learning device 100 according to the present example embodiment is described. FIG. 14 is a flowchart illustrating one example of an operation (processing procedure) of the action recognition model learning device 100 according to the present example embodiment.

The action recognition model learning device 100 automatically estimates a movement locus of a person within camera image data for error learning (Step S301). At this occasion, the movement locus estimation unit 114 may automatically estimate the movement locus of the person within an image by using the camera image data for error learning. Further, as described above, the movement locus automatic estimation method may be the same method as an automatic estimation method for use in generating movement locus data to be input to an action recognition model at a stage of recognizing an action of a person by using a learned action recognition model.

The action recognition model learning device 100 calculates, as an estimation error, a difference between correct movement locus data of the person within the camera image data for error learning, and movement locus data of the person, which is automatically estimated in Step S301 (Step S302). The correct movement locus data of the person within the camera image data for error learning are data in which a movement locus of the person within the camera image data for error learning is accurately expressed. More specifically, regarding processing of Step S302, the estimation error calculation unit 115 may perform the processing of calculating an estimation error. As described above, time-series data of an estimation error generated by the estimation error calculation unit 115 are used as learning data for learning an error generation model.

The action recognition model learning device 100 learns an error generation model for generating a time sequence of an estimation error of a movement locus (Step S303). More specifically, the error generation model learning unit 116 may perform processing of learning an error generation model. By the processing, the action recognition model learning device 100 can learn an error generation model capable of accurately generating an estimation error to be added to movement locus data for action learning.

The action recognition model learning device 100 acquires a movement locus from the movement locus data for action learning (Step S304).

The action recognition model learning device 100 generates and outputs error-added movement locus data by adding, to the movement locus acquired from the movement locus data for action learning, the estimation error to be generated by the error generation model (Step S305). More specifically, the second error addition unit 117 may perform the above-described processing.

The action recognition model learning device 100 extracts, from the error-added movement locus data generated in Step S305, a feature for recognizing an action of the person (Step S306). The processing may be similar to Step S205 according to the first example embodiment.

The action recognition model learning device 100 determines whether processing from Step S305 to Step S306 has been performed a predetermined number of times with respect to the movement locus acquired from the movement locus data for action learning (Step S307).

When the predetermined number of times has not reached (NO in Step S307), the action recognition model learning device 100 performs again the above-described processing from Step S305 to Step S306 with respect to the same movement locus. Since an estimation error to be added by the second error addition unit 117 is generated by a stochastic generation model (error generation model), the error-added movement locus data to be acquired and the feature thereof change each time, when the estimation error is generated. By the iteration processing, the action recognition model learning device 100 can generate different movement loci (error-added movement locus data) in which various estimation errors are added. Thus, the action recognition model learning device 100 can learn a more robust action recognition model with respect to an estimation error of a movement locus by using such error-added movement locus data.

When the determination result in Step S307 is YES, the action recognition model learning device 100 determines whether processing from Step S304 to Step S307 has completed with respect to all movement loci included in the movement locus data for action learning (Step S308). When an unprocessed movement locus remains (NO in Step S308), the action recognition model learning device 100 performs the above-described processing from Step S304 to Step S307 with respect to the unprocessed movement locus.

When the determination result in Step S308 is YES, the action recognition model learning device 100 learns an action recognition model by using a feature extracted from the movement loci to which various estimation errors are added with respect to all movement loci included in the movement locus data for action learning, and an action label appended to each of the movement loci (Step S309). The action recognition model recognizes an action of the person, based on a movement locus of the person. The action recognition model learning device 100 may output a learned action recognition model. Specific learning processing in Step S309 may be similar to Step S208 (FIG. 8) according to the second example embodiment, for example.

The action recognition model learning device 100 according to the present example embodiment can learn, by the above-described processing configuration, an action recognition model capable of recognizing an action of a person with high accuracy, based on a movement locus of the person estimated by using a camera image. This is because the action recognition model learning device 100 according to the present example embodiment generates movement locus data, taking into consideration an estimation error included in a movement locus of a person to be estimated by using a camera image, and learns an action recognition model by using generated error-added movement locus data, as learning data.

In the present example embodiment, the action recognition model learning device 100 learns, as a generation model (error generation), a pattern of an estimation error generated in estimating a movement locus of a person by using a camera image. The action recognition model learning device 100 generates error-added movement locus data by adding, to a movement locus included in movement locus data for action learning, an estimation error generated by using the learned generation model (error generation model).

Thus, the action recognition model learning device 100 enables accurately reproducing an estimation error of a movement locus, which may be actually generated in estimating a movement locus from a camera image. Therefore, the action recognition model learning device 100 can learn a high-accuracy action recognition model.

The action recognition model learning device 100 employs an ergodic HMM, as an error generation model of a movement locus. Thus, the action recognition model learning device 100 is able to generate data reflecting a difference in property of an estimation error relating to a movement locus, and being more accurate error-added movement locus data. Specifically, the action recognition model learning device 100 can learn a more accurate action recognition model. An estimation error relating to a movement locus results from the presence or absence of overlapping of persons included in a camera image.

In the foregoing, a specific example of a case where movement locus data for action learning and correct movement locus data represent a position of a person within a world coordinate system has been described. In the present example embodiment, similar processing is enabled, and a similar advantageous effect is acquired, even when movement locus data for action learning and correct movement locus data are converted from data within a world coordinate system into data representing a position of a person within a camera image coordinate system. In this case, the movement locus estimation unit 114 automatically estimates a movement locus of a person within camera image data for error learning, as position data within a camera image, and outputs the data.

<Configuration of Hardware and Software Program (Computer Program)>

In the following, a hardware configuration capable of achieving each of the above-described example embodiments and a modification example thereof is described. In the following description, each of the action recognition model learning devices (10 and 100) described in each of the above-described example embodiments is generically referred to as a "model learning device".

Each of the model learning devices described in each of the above-described example embodiments may be configured by one or a plurality of dedicated hardware devices. In this case, each of the constituent elements illustrated in the above-described drawings (e.g. FIGS. 1A to 1C, 2, and 10) may be achieved as a hardware (an integrated circuit or the like in which a processing logic is mounted) in which a part or all of the constituent elements are integrated.

For example, when the model learning device is achieved by a hardware, constituent elements of the model learning device may be mounted as an integrated circuit (e.g., a system on a chip (SoC) or the like) capable of providing a function of each of the constituent elements. In this case, for example, data included in a constituent element of the model learning device may be stored in a random access memory (RAM) area integrated on an SoC, or a flash memory area.

In this case, a communication network including a known communication bus may be employed as a communication line for connecting constituent elements of the model learning device. A communication line for connecting the constituent elements may be connected by peer-to-peer connection between the constituent elements. When the model learning device is configured by a plurality of hardware devices, the hardware devices may be communicably connected by an appropriate communication method (a wired communication method, a wireless communication method, or combination of these methods).

For example, the model learning device may be achieved by employing a processing circuitry capable of achieving functions of the error-added movement locus generation unit (11, 110), the feature extraction unit (12, 120), and the action recognition model learning unit (13, 130), a communication circuit, a storage circuit, and the like. Various variations are proposed in mounting a circuit configuration for achieving the model learning device.

Figure 15:
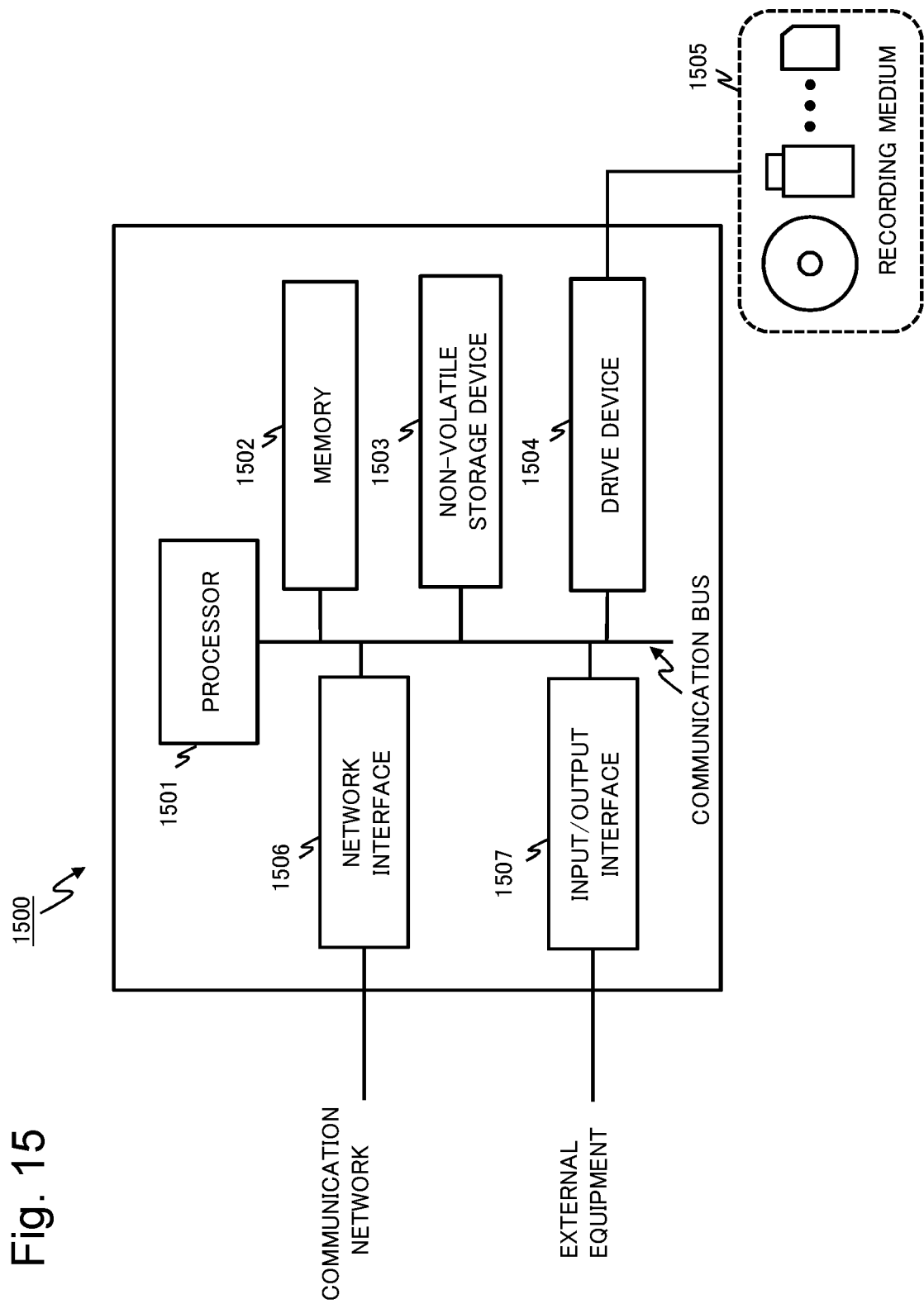
FIG. 15 is an explanatory diagram illustrating one example of a hardware configuration capable of achieving an action recognition model learning device according to the present disclosure.

The above-described model learning device may be configured by a general-purpose hardware device 1500 as exemplified in FIG. 15, and various types of software programs (computer programs) to be executed by the hardware device 1500. In this case, the model learning device may be achieved as a system configured by an appropriate number being one or more of hardware devices 1500 and software programs.

A processor 1501 (processor) in FIG. 15 is, for example, a general-purpose central processing unit (CPU) or a microprocessor. The processor 1501 may read various types of software programs stored in a non-volatile storage device 1503 described later on a memory 1502, and execute processing according to the software programs. In this case, a constituent element of the model learning device according to each of the above-described example embodiments is achievable as a software program to be executed by the processor 1501, for example.

The model learning device according to each of the above-described example embodiments may be achieved by one or more programs capable of achieving functions of the error-added movement locus generation unit (11, 110), the feature extraction unit (12, 120), and the action recognition model learning unit (13, 130), for example. Various variations are proposed in mounting the programs.

The memory 1502 is a memory device (e.g., a RAM and the like) referable from the processor 1501, and stores a software program, various types of data, and the like. The memory 1502 may be a volatile memory device. In the above-described model learning device, an action recognition model, an error generation model, and various types of data (movement locus data for action learning, error-added movement locus data, time-series data of an estimation error, and the like) may be read in the memory 1502.

The non-volatile storage device 1503 is, for example, a non-volatile storage device, such as a magnetic disk drive, or a semiconductor storage device by a flash memory. The non-volatile storage device 1503 is capable of storing various types of software programs, data, and the like. In the above-described model learning device, an action recognition model, an error generation model, and various types of data (movement locus data for action learning, error-added movement locus data, time-series data of an estimation error, and the like) may be stored in the non-volatile storage device 1503.

A drive device 1504 is, for example, a device for processing reading and writing of data to and from a recording medium 1505 described later. The model learning device may read various types of data recorded in the recording medium 1505 described later via the drive device 1504, for example.

The recording medium 1505 is, for example, a recording medium capable of recording data, such as an optical disc, a magneto-optical disk, and a semiconductor flash memory. In the present disclosure, a type and a recording method (format) of the recording medium are not specifically limited, and may be selected as necessary.

A network interface 1506 is an interface device to be connected to a communication network. An interface device for wired and wireless local area network (LAN) connections, and the like may be employed as the network interface 1506, for example. The model learning device may receive various types of data from another device connected to a communication network via the network interface 1506, for example.

An input-output interface 1507 is a device for controlling input and output to and from an external device. The external device may be, for example, input equipment (e.g., a keyboard, a mouse, a touch panel, and the like) capable of receiving an input from a user. The external device may be, for example, output equipment (e.g., a monitor screen, a touch panel, and the like) capable of presenting various types of outputs to a user. The model learning device may output a result of determination of an action of a certain person from a movement locus of the person by using an action recognition model via an input-output interface, for example.

A model learning device according to the present disclosure described by each of the above-described example embodiments as an example may be achieved by supplying, to the hardware device 1500 exemplified in FIG. 15, a software program capable of achieving a function described in each of the above-described example embodiments. More specifically, for example, a technique according to the present disclosure may be achieved by causing the processor 1501 to execute a software program supplied to the hardware device 1500. In this case, an operating system operating on the hardware device 1500, a middleware such as a database management software and a network software, and the like may execute a part of each processing.

In each of the above-described example embodiments, each unit illustrated in each of the above-described drawings may be achieved as a software module being a unit of a function (processing) of a software program to be executed by the above-described hardware. For example, when each of the above-described units is achieved as a software module, these software modules may be stored in the non-volatile storage device 1503. Further, the processor 1501 may read these software modules in the memory 1502 in executing each of the processing.

Further, these software modules may be configured in such a way that various types of data can be mutually transmitted by an appropriate method such as a shared memory and inter-process communication. By such a configuration, these software modules are connected in a mutually communicable manner.

Each of the above-described software programs may be recorded in the recording medium 1505. In this case, each of the above-described software programs may be stored in the non-volatile storage device 1503 via the drive device 1504 as necessary at a time of shipment, an operation stage, or the like of the above-described communication device and the like.

Various types of software programs may be installed in the hardware device 1500 by using an appropriate jig (tool) at a manufacturing stage before shipment of the model learning device, a maintenance stage after shipment, or the like. Various types of software programs may be downloaded from an outside via a communication line such as the Internet. As a method for supplying a software program, it is possible to employ various general procedures.

In such a case, a technique according to the present disclosure may be configured by codes constituting a software program, or a computer-readable recording medium recording the codes. In this case, the recording medium is not limited to a medium independent of the hardware device 1500, and includes a recording medium (various types of storages and the like) in which a software program transmitted by an LAN, the Internet, and the like is downloaded, and stored or temporarily stored.

The above-described model learning device, or a constituent element of the model learning device may be configured by a virtual environment acquired by virtualizing the hardware device 1500 exemplified in FIG. 15, and a software program (computer program) to be executed in the virtual environment. In this case, a constituent element of the hardware device 1500 exemplified in FIG. 15 is provided as a virtual device in a virtual environment.

When a model learning device according to the present disclosure is configured by employing the hardware device 1500 as described above, the hardware device 1500 can function as a unique device capable of improving a computer-related technique associated with the present disclosure (technique for determining an action of a subject from a camera image).

While the invention has been particularly shown and described with reference to exemplary embodiments (and examples) thereof, the invention is not limited to these embodiments (and examples). It will be understood by those of ordinary skill in the art that various changes in form and details may be made therein without departing from the spirt and scope of the present invention as defined by the claims.

This application is based upon and claims the benefit of priority from Japanese patent application No. 2017-236143, filed on Dec. 8, 2017, the disclosure of which is incorporated herein in its entirety by reference.

REFERENCE SIGNS LIST

10 Action recognition model learning device
11 Error-added movement locus generation unit
12 Feature extraction unit
13 Action recognition model learning unit
100 Action recognition model learning device
110 Error-added movement locus generation unit
120 Feature extraction unit
130 Action recognition model learning unit
1501 Processor
1502 Memory
1503 Non-volatile storage device
1504 Drive device
1505 Recording medium
1506 Network interface
1507 Input/output interface

What is claimed is:

1. A model learning device comprising:
at least one processor configured to:
generate error-added movement locus data by adding an error to movement locus data for action learning, the movement locus data for action learning representing a movement locus of a subject and including an action label, the action label being information about an action of the subject;
learn a model from a movement locus of a certain subject by using learning data, the model being a model to recognize an action of the subject, the learning data being generated based on at least the error-added movement locus data and the action label;
generate, from the error-added movement locus data, a feature for use in recognizing the action of the subject,
generate the error-added movement locus data by adding an estimation error to the movement locus data for action learning, the estimation error is generated in estimating the movement locus by using a camera image captured by an image-capturing device, and
learn the model by using the learning data generated by using the generated feature, and the action label.

2. The model learning device according to claim 1, wherein
the movement locus data for action learning are data representing the movement locus of the subject within a real space, and
the at least one processor is further configured to:
convert the movement locus data for action learning into data representing the movement locus within the camera image, add, to the converted movement locus data, an estimation error generated in estimating a position of the subject within the camera image, and generate the error-added movement locus data by converting the movement locus data into data representing the movement locus within the real space, the movement locus data being data to which the estimation error is added.

3. The model learning device according to claim 2, wherein the at least one processor converts the movement locus data for action learning representing the movement locus of the subject in a coordinate system within the real space, into data representing the movement locus in a camera coordinate system being a coordinate system in the camera image acquired by capturing the subject by the image-capturing device, the at least one processor adds, as the estimation error, a Gaussian noise to the data representing the movement locus in the camera coordinate system, the Gaussian noise has a variance of a certain specific magnitude, and the at least one processor converts the movement locus data in the camera coordinate system, to which the estimation error is added, into the data representing the movement locus in the coordinate system in the real space.

4. The model learning device according to claim 1, wherein the at least one processor is further configured to:

estimate a movement locus of a person within the camera image acquired by capturing the subject, by using camera image data for error learning being data including the camera image, calculate, as the estimation error, a difference between correct movement locus data representing a correct movement locus of the subject within the camera image, and the movement locus data representing the estimated movement locus of the subject, learn an error generation model, the error generation model being a model capable of generating time-series data of the estimation error by using, as learning data, the calculated estimation error, and generate the error-added movement locus data by adding, to the movement locus data for action learning, the estimation error generated by the error generation model.

5. The model learning device according to claim 4, wherein the error generation model is an ergodic hidden Markov model (HMM) for stochastically outputting time-series data of a vector representing the estimation error, and the at least one processor learns parameters of a state transition probability of an ergodic HMM and an output probability distribution of each state by using time-series data of the calculated estimation error.

6. An action recognition model learning method comprising:

by at least one processor, generating error-added movement locus data by adding an error to movement locus data for action learning, the movement locus data for action learning representing a movement locus of a subject and including an action label, the action label being information about an action of the subject;

learning a model from a movement locus of a certain subject by using learning data, the model being a model to recognize an action of the subject, the learning data being generated based on at least the error-added movement locus data and the action label;

generating the error-added movement locus data by adding an estimation error to the movement locus data for action learning, the estimation error being generated in estimating a movement locus by using a camera image captured by an image-capturing device;

generating a feature, from the generated error-added movement locus data, for use in recognizing an action of the subject; and learning the model by using the learning data generated by using the generated feature, and the action label.

7. A non-transitory recording medium recording a model learning program causing a computer to execute:

generating error-added movement locus data by adding an error to movement locus data for action learning, the movement locus data for action learning representing a movement locus of a subject and including an action label, the action label being information about an action of the subject;

learning a model from a movement locus of a certain subject by using learning data, the model being a model to recognize an action of the subject, the learning data being generated based on at least the error-added movement locus data and the action label;

generating the error-added movement locus data by adding an estimation error to the movement locus data for action learning, the estimation error being generated in estimating a movement locus by using a camera image captured by an image-capturing device;

generating, from the generated error-added movement locus data, a feature for use in recognizing an action of the subject; and learning the model by using the learning data generated by using the generated feature, and the action label.

* * * * *